US011748610B1

(12) United States Patent
Majumder et al.

(10) Patent No.: US 11,748,610 B1
(45) Date of Patent: Sep. 5, 2023

(54) BUILDING SEQUENCE TO SEQUENCE (S2S) MODELS USING PREVIOUSLY GENERATED S2S MODELS WITH SIMILAR USE CASES

(71) Applicant: Amazon Technologies, Inc., Seattle, WA (US)

(72) Inventors: Orchid Majumder, Bellevue, WA (US); Vineet Khare, Redmond, WA (US); Leo Parker Dirac, Seattle, WA (US); Saurabh Gupta, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 1500 days.

(21) Appl. No.: 15/934,712

(22) Filed: Mar. 23, 2018

Related U.S. Application Data

(60) Provisional application No. 62/590,216, filed on Nov. 22, 2017.

(51) Int. Cl.
*G06N 3/08* (2023.01)
*G06N 3/044* (2023.01)
*G06F 9/54* (2006.01)
*G06F 9/455* (2018.01)

(52) U.S. Cl.
CPC ........... *G06N 3/08* (2013.01); *G06F 9/45558* (2013.01); *G06F 9/547* (2013.01); *G06N 3/044* (2023.01); *G06F 2009/45575* (2013.01); *G06F 2009/45595* (2013.01)

(58) Field of Classification Search
CPC ................................ G06N 3/08; G06N 3/0445
See application file for complete search history.

(56) References Cited

U.S. PATENT DOCUMENTS

| 9,830,315 | B1* | 11/2017 | Xiao ...................... G06F 40/30 |
| 2012/0095746 | A1* | 4/2012 | Rao ..................... G06F 30/3312 703/14 |
| 2017/0068902 | A1* | 3/2017 | Kirshner ................. G06F 30/20 |
| 2017/0111233 | A1* | 4/2017 | Kokkula ................. H04L 43/08 |
| 2017/0270427 | A1* | 9/2017 | Zhou ...................... G06N 20/00 |
| 2019/0048740 | A1* | 2/2019 | Agarwal ............... G06F 16/285 |

OTHER PUBLICATIONS

Abadi et al. (TensorFlow: A System for Large-Scale Machine Learning, Nov. 2016, pp. 264-283) (Year: 2016).*
Sriram et al. (Cold Fusion: Training Seq2Seq Models Together with Language Models, Aug. 2017, pp. 1-7) (Year: 2017).*
Luong et al. (Multi-Tasks Sequence to Sequence Learning, Mar. 2016, pp. 1-10) (Year: 2016).*
Chetlur et al. (cuDNN: Efficient Primitives for Deep Learning, Dec. 2014, pp. 1-9) (Year: 2014).*
Fan et al. (Controllable Abstractive Summarization, Nov. 2017, pp. 1-10) (Year: 2017).*

* cited by examiner

*Primary Examiner* — George Giroux
(74) *Attorney, Agent, or Firm* — Nicholson De Vos Webster & Elliott LLP

(57) ABSTRACT

Techniques for sequence to sequence (S2S) model building and/or optimization are described. For example, a method of receiving a request to build a sequence to sequence (S2S) model for a use case, wherein the request includes at least a training data set, generating parts of a S2S algorithm based on the at least one use case, determined parameters, and determined hyperparameters, and training a S2S algorithm built from the parts of the S2S algorithm using the training data set to generate the S2S model is detailed.

20 Claims, 24 Drawing Sheets

```
job_name = 'DEMO-seq2seq-en-de-' + strftime("%Y-%m-%d-%H", gmtime())
print("Training job", job_name)
create_training_params = \
{
    "AlgorithmSpecification": {
1301 ⌒    "TrainingImage": container,
        "TrainingInputMode": "File"  },
    "RoleArn": role,
    "OutputDataConfig": { "S3OutputPath": "s3://{}/{}/".format(bucket, prefix) },
    "ResourceConfig": { "InstanceCount": 1, "InstanceType": "ml.p2.xlarge",
        "VolumeSizeInGB": 50  },
    "TrainingJobName": job_name,
    "HyperParameters": { "max_seq_len_source": "60", "max_seq_len_target": "60",
1303 ⌒      "optimized_metric": "bleu", "batch_size": "64", "rnn_num_hidden": "512",
        "num_layers_encoder": "1", "num_layers_decoder": "1", "num_embed_source": "512",
        "num_embed_target": "512",  "checkpoint_threshold": "3", "max_num_batches": "2100" },
    "StoppingCondition": { "MaxRuntimeInSeconds": 48 * 3600  },
    "InputDataConfig": [
      { "ChannelName": "train",
        "DataSource": {
          "S3DataSource": { "S3DataType": "S3Prefix", "S3Uri": "s3://{}/{}/train/".format(bucket,
  prefix), "S3DataDistributionType": "FullyReplicated"  }
        },
      },
      {
        "ChannelName": "vocab",
        "DataSource": {
          "S3DataSource": { "S3DataType": "S3Prefix", "S3Uri": "s3://{}/{}/vocab/".format(bucket,
  prefix), "S3DataDistributionType": "FullyReplicated" }
        },
      },
      {
        "ChannelName": "validation",
        "DataSource": {
          "S3DataSource": {"S3DataType": "S3Prefix", "S3Uri": "s3://{}/{}/validation/".format(bucket,
  prefix), "S3DataDistributionType": "FullyReplicated"}
        },
      }
    ]
}
sagemaker_client = boto3.Session().client(service_name='sagemaker')
sagemaker_client.create_training_job(**create_training_params)
status = sagemaker_client.describe_training_job(TrainingJobName=job_name)['TrainingJobStatus']
print(status)
```

*FIG. 13*

| Parameter Key | Description | Choices | Default |
|---|---|---|---|
| max_seq_len_source | Maximum length for the source sequence length. Sequences more than this length will be truncated to this length. | positive integer | 100 |
| max_seq_len_target | Maximum length for the target sequence length. Sequences more than this length will be truncated to this length. | positive integer | 100 |
| encoder_type | Encoder type. RNN architecture is based on attention mechanism by Bahdanau et al. and CNN architecture is based on Gehring et al. | string (rnn,cnn) | rnn |
| decoder_type | Decoder type. | string (rnn,cnn) | rnn |
| num_layers_encoder | Number of layers for Encoder RNN or CNN. | positive integer | 1 |
| num_layers_decoder | Number of layers for Decoder RNN or CNN. | positive integer | 1 |
| rnn_num_hidden | Number of RNN hidden units for encoder and decoder. | positive integer | 1024 |
| rnn_cell_type | Specific type of RNN architecture. | string (lstm,gru) | lstm |
| rnn_decoder_state_init | How to initialize RNN decoder states from encoders. | string (last, avg, zero) | last |
| rnn_residual_connections | Add residual connection to stacked RNN. Number of layers should be more than 1. | boolean (true, false) | false |
| rnn_first_residual_layer | First RNN layer to have a residual connection, only applicable if number of layers in encoder or decoder is more than 1. | positive integer | 2 |
| cnn_kernel_width_encoder | Kernel width for the CNN encoder. | positive integer | 3 |

*FIG. 14(a)*

| | | | |
|---|---|---|---|
| cnn_kernel_width_decoder | Kernel width for the CNN decoder. | positive integer | 5 |
| cnn_num_hidden | Number of CNN hidden units for encoder and decoder. | positive integer | 512 |
| cnn_activation_type | CNN activation type to be used. | string {glu,relu,softrelu,sigmoid,tanh} | glu |
| cnn_hidden_dropout | Dropout probability for dropout between convolutional layers. | float in [0,1] | 0.0 |
| num_embed_source | Embedding size for source tokens. | positive integer | 512 |
| num_embed_target | Embedding size for target tokens. | positive integer | 512 |
| embed_dropout_source | Dropout probability for source side embeddings. | float in [0,1] | 0.0 |
| embed_dropout_target | Dropout probability for target side embeddings. | float in [0,1] | 0.0 |
| rnn_attention_type | Attention model for encoders. mlp refers to concat and bilinear refers to general from the Luong et al. paper. | string{dot,fixed,mlp,bilinear} | mlp |
| rnn_attention_num_hidden | Number of hidden units for attention layers. defaults to rnn_num_hidden. | positive integer | rnn_num_hidden |
| rnn_attention_in_upper_layers | Pass the attention to upper layers of RNN, like Google NMT paper.Only applicable if more than one layer used. | boolean (true, false) | true |
| rnn_decoder_hidden_dropout | Dropout probability for hidden state that combines the context with the RNN hidden state in the decoder. | float in [0,1] | 0.0 |
| batch_size | Mini batch size for gradient descent. | positive integer | 64 |
| bucketing_enabled | Set false to disable bucketing, unroll to maximum length. | boolean (true, false) | true |

*FIG. 14(b)*

| | | | |
|---|---|---|---|
| bucket_width | Returns (source,target) buckets upto (max_seq_len_source, max_seq_len_target). The longer side of the data uses steps of bucket_width while the shorter side uses steps scaled down by the average target/source length ratio. If one sided reaches its maximum length before the other, width of extra buckets on that side is fixed to that side of max_len. | positive integer | 10 |
| loss_type | Loss function for training. | string (cross-entropy) | cross-entropy |
| training_metric | Metrics to track on training on validation data. | string (perplexity, accuracy) | perplexity |
| optimized_metric | Metrics to optimize with early stopping. | string (perplexity, accuracy, bleu) | perplexity |
| bleu_sample_size | Number of instances to pick from validation dataset to decode & compute BLEU score during training. Set to -1 to use full validation set (if BLEU is chosen as optimized_metric). | integer | 0 |
| max_num_batches | Maximum number of updates/batches to process. -1 for infinite. | integer | -1 |
| checkpoint_frequency_num_batches | Checkpoint and evaluate every x batches. | positive integer | 1000 |
| checkpoint_threshold | Maximum number of checkpoints model is allowed to not improve in <optimized_metric> on validation dataset before training is stopped. | positive integer | 3 |
| max_num_epochs | Maximum number of epochs to pass through training data before fitting is stopped. Training will continue till this number of epochs even if validation accuracy is not improving if this parameter is passed. Ignored if not passed. | positive integer | |
| optimizer_type | Optimizer to choose from. | string (adam, sgd, rmsprop) | adam |

FIG. 14(c)

| weight_init_type | Type of Weight Initialization | string (uniform, xavier) | xavier |
|---|---|---|---|
| weight_init_scale | Weight initialization scale ( for uniform & xavier initialization). | float | 2.34 |
| xavier_factor_type | Xavier factor type. | string (in, out, avg) | in |
| learning_rate | Initial learning rate. | float | 0.0003 |
| weight_decay | Weight decay constant. | float | 0.0 |
| momentum | Momentum constant used for SGD. Don't pass this parameter if you are using Adam or Rmsprop. | float | |
| clip_gradient | Clip absolute gradient values greater than this. Set to negative to disable. | float | 1.0 |
| lr_scheduler_type | Learning rate scheduler type. plateau_reduce means reduce the learning rate whenever optimized_metric on validation_accuracy plateaus. inv_t is inverse time decay. learning_rate/(1+decay_rate*t) | string(plateau_reduce, fixed_rate_inv_t, fixed_rate_inv_sqrt_t) | plateau_reduce |
| plateau_reduce_lr_factor | Factor to multiply learning rate with (for plateau-reduce). | float | 0.5 |
| plateau_reduce_lr_threshold | For plateau-reduce scheduler, multiply learning rate with reduce factor if <optimized_metric> didn't improve for this many checkpoints. | positive integer | 3 |
| fixed_rate_lr_half_life | Half life for learning rate in terms of number of checkpoints for fixed_rate_* schedulers. | positive integer | 10 |
| beam_size | Length of the beam for beam search. Used during training for computing BLEU and used during inference. | positive integer | 5 |

*FIG. 14(d)*

BUILDING SEQUENCE TO SEQUENCE (S2S) MODELS USING PREVIOUSLY GENERATED S2S MODELS WITH SIMILAR USE CASES

CROSS-REFERENCE TO RELATED APPLICATIONS

This application claims the benefit of U.S. Provisional Application No. 62/590,216, filed Nov. 22, 2017, which is hereby incorporated by reference.

BACKGROUND

Computing devices can utilize communication networks to exchange data. Companies and organizations operate computer networks that interconnect a number of computing devices to support operations or to provide services to third parties. The computing systems can be located in a single geographic location or located in multiple, distinct geographic locations (e.g., interconnected via private or public communication networks). Specifically, data centers or data processing centers, herein generally referred to as a "data center," may include a number of interconnected computing systems to provide computing resources to users of the data center. To facilitate increased utilization of data center resources, virtualization technologies allow a single physical computing device to host one or more instances of virtual machines that appear and operate as independent computing devices to users of a data center.

BRIEF DESCRIPTION OF DRAWINGS

Various embodiments in accordance with the present disclosure will be described with reference to the drawings, in which:

FIG. 13 illustrates an example S2S job to be run according to some embodiments.

FIGS. 14(a)-14(d) illustrate exemplary hyperparameters according to some embodiments.

DETAILED DESCRIPTION

Figure 1:
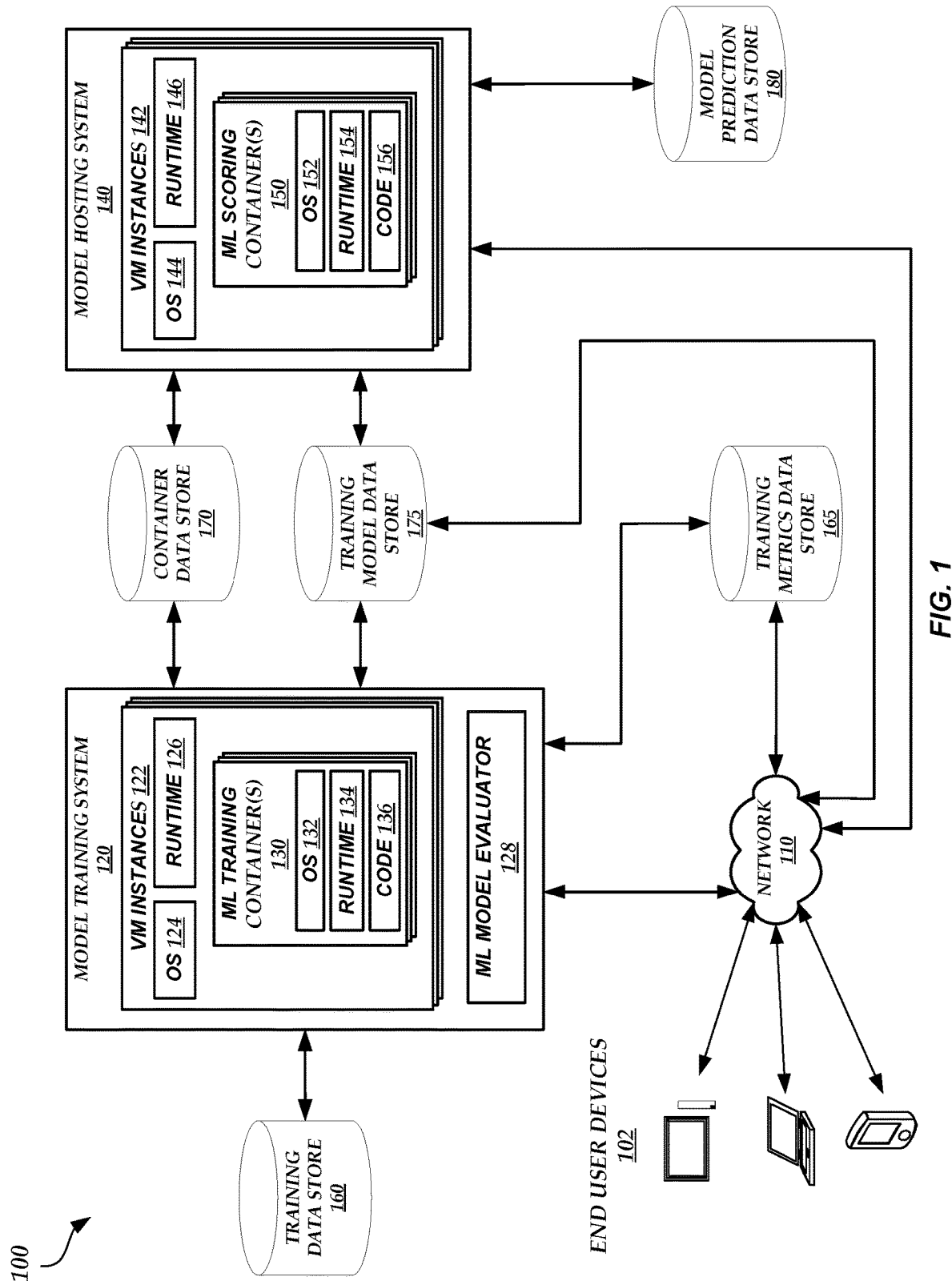
FIG. 1 is a block diagram of an illustrative operating environment in which machine learning models are trained and hosted, in some embodiments.

Various embodiments of methods, apparatuses, systems, and non-transitory computer-readable storage media for sequence to sequence (S2S) modeling are described. According to some embodiments, the generation of a S2S model is described where the input to the S2S model is a sequence of tokens (e.g. text, audio, etc.) and the output generated is another sequence of tokens. Exemplary applications of S2S include, but are not limited to: machine translation (inputting a sentence from one language and predicting what that sentence would be in another language), text summarization (inputting a longer string of words and predicting a shorter string of words that is a summary), and speech to text (audio clips converted into output sentences in tokens). In some embodiments, the S2S model uses Recurrent Neural Networks and Transformer Models with attention as well as encoder-decoder architectures.

With the recent advent of Deep Neural Networks (aka Deep Learning), S2S models have seen significant performance improvement over traditional statistical methods for most of these tasks. Despite having such impressive success, S2S models are not widely used by application developers because of a steep initial learning curve in terms of building the state-of-the-art models using popular deep learning frameworks as well as the necessary compute resources to run a lot of experiments to get optimal results. Embodiments detailed below aims to reduce that barrier by doing most of the heavy-lifting so that application developers can only bring their dataset, have minimal knowledge about the task they want to perform, and use S2S modeling via application programming interface (API) calls.

As described above, embodiments enable a single physical computing device (or multiple physical computing devices) to host one or more instances of virtual machines that appear and operate as independent computing devices to users. In some embodiments, a service provider can leverage virtualization technologies to provide a network-accessible machine learning service, such as the network-accessible machine learning model training and hosting system described herein. For example, the service provider can operate one or more physical computing devices accessible to user devices via a network. These physical computing device(s) can host virtual machine instances that are configured to train and/or execute machine learning models in response to commands received from user devices.

The embodiments described herein provide several technical benefits over conventional computing systems configured to train machine learning models. For example, training machine learning models can result in the usage of a large amount of processing power because machine learning models can be very complex and the amount of data used to train the models can be very large (e.g., in the gigabytes, terabytes, petabytes, etc.). Thus, some users acquire physically large conventional computing machines to perform the training. Users, however, may customize these conventional computing machines with specific software to execute the desired model training. On the other hand, embodiments described herein provide an environment in which users do not have to generate and implement a large amount of customized code. Rather, users can simply provide just enough information to define a type of machine learning model to train, and the embodiments described herein can automatically initialize virtual machine instances, initialize containers, and/or perform other operations to implement a model training service.

On the other hand, embodiments described herein are configured to distribute the training across different physical computing devices in some embodiments. Thus, the time to train a model can be significantly reduced.

Valuable time can be lost if the resulting trained model turns out to be inaccurate. On the other hand, embodiments described herein can periodically evaluate models during the training process and output metrics corresponding to the evaluation. Thus, users can review the metrics to determine if, for example, a machine learning model being trained is inaccurate and whether it may be beneficial for the training job to be stopped.

Users can experience significant machine learning model training delays if a conventional computing machine is already in the process of training another model. On the other hand, embodiments described herein dynamically allocate computing resources to perform model training based on user demand in some embodiments. Thus, if a single user or multiple users desire to train multiple machine learning models during an overlapping time period, the trainings can be performed simultaneously.

These conventional services, however, are generally restricted to a single type of machine learning model and only allow prescribed data input formats. Users, on the other hand, may desire to train and use many different types of machine learning models that can receive different types of input data formats. Unlike these conventional services, embodiments described herein provide a flexible execution environment in which machine learning models can be trained and executed irrespective of the type of machine learning model, the programming language in which the machine learning model is defined, the data input format of the machine learning model, and/or the data output format of the machine learning model.

Example Machine Learning Model Training and Hosting Environment

FIG. 1 is a block diagram of an illustrative operating environment 100 in which machine learning models are trained and hosted, in some embodiments. The operating environment 100 includes end user devices 102, a model training system 120, a model hosting system 140, a training data store 160, a training metrics data store 165, a container data store 170, a training model data store 175, and a model prediction data store 180.

Example Model Training System

In some embodiments, users, by way of user devices 102, interact with the model training system 120 to provide data that causes the model training system 120 to train one or more machine learning models. The user devices 102 can interact with the model training system 120 via frontend 129 of the model training system 120. For example, a user device 102 can provide a training request to the frontend 129 that includes a container image (or multiple container images), an indicator of input data (e.g., an address or location of input data), hyperparameter values (e.g., values indicating how the algorithm will operate, how many algorithms to run in parallel, how many clusters into which to separate data, etc.), and/or information describing the computing machine on which to train a machine learning model (e.g., a graphical processing unit (GPU) instance type, a central processing unit (CPU) instance type, an amount of memory to allocate, a type of virtual machine instance to use for training, etc.).

In some embodiments, the container image can include one or more layers, where each layer represents an executable instruction. Some or all of the executable instructions together represent an algorithm that defines a machine learning model. The executable instructions (e.g., the algorithm) can be written in any programming language (e.g., Python, Ruby, C++, Java, etc.). In some embodiments, the algorithm is pre-generated and obtained by a user, via the user device 102, from an algorithm repository (e.g., a network-accessible marketplace, a data store provided by a machine learning training service, etc.). In some embodiments, the algorithm is user-generated.

In some embodiments, instead of providing a container image in the training request, the user device 102 merely provides, in the training request, an algorithm written in any programming language. The model training system 120 then packages the algorithm into a container that is eventually loaded into a virtual machine instance 122 for training a machine learning model, as described in greater detail below.

In some embodiments, instead of providing a container image in the training request, the user device 102 provides, in the training request, an indicator of a container image (e.g., an indication of an address or a stored location of a container image). For example, the container image can be stored in the container data store 170. The model training system 120 can then retrieve the container image from the indicated location and create a container using the retrieved container image. The container is then loaded into a virtual machine instance 122 for training a machine learning model, as described in greater detail below.

The model training system 120 can use the information provided by the user device 102 to train a machine learning model in one or more pre-established virtual machine instances 122 in some embodiments. In particular, the model training system 120 includes a single physical computing device or multiple physical computing devices that are interconnected using one or more computing networks (not shown), where the physical computing device(s) host one or more virtual machine instances 122. The model training system 120 can handle the acquisition and configuration of compute capacity (e.g., containers, instances, etc., which are described in greater detail below) based on the information describing the computing machine on which to train a machine learning model provided by the user device 102. The model training system 120 can then train machine learning models using the compute capacity, as is described in greater detail below. The model training system 120 can automatically scale up and down based on the volume of training requests received from user devices 102 via frontend 129, thereby relieving the user from the burden of having to worry about over-utilization (e.g., acquiring too little computing resources and suffering performance issues) or under-utilization (e.g., acquiring more computing resources than necessary to train the machine learning models, and thus overpaying).

In some embodiments, the virtual machine instances 122 are utilized to execute tasks. For example, such tasks can include training a machine learning model. As shown in FIG. 1, each virtual machine instance 122 includes an operating system (OS) 124, a language runtime 126, and one or more machine learning (ML) training containers 130. Generally, the ML training containers 130 are logical units created within a virtual machine instance using the resources available on that instance, and can be utilized to isolate execution of a task from other processes (e.g., task executions) occurring in the instance. In some embodiments, the ML training containers 130 are formed from one or more container images and a top container layer. Each container image further includes one or more image layers, where each image layer represents an executable instruction. As described above, some or all of the executable instructions together represent an algorithm that defines a machine learning model. Changes made to the ML training containers 130 (e.g., creation of new files, modification of existing files, deletion of files, etc.) are stored in the top container layer. If a ML training container 130 is deleted, the top container layer is also deleted. However, the container image(s) that form a portion of the deleted ML training container 130 can remain unchanged. The ML training containers 130 can be implemented, for example, as Linux containers.

The ML training containers 130 each include individual copies of an OS 132, runtime 134, and code 136 in some embodiments. The OS 132 and/or the runtime 134 can be defined by one or more executable instructions that form at least a portion of a container image that is used to form the ML training container 130 (e.g., the executable instruction(s) in the container image that define the operating system and/or runtime to run in the container formed from the container image). The code 136 includes one or more executable instructions that form at least a portion of a container image that is used to form the ML training container 130. For example, the code 136 includes the executable instructions in the container image that represent an algorithm that defines a machine learning model. The OS 132 and/or runtime 134 are configured to execute the code 136 in response to an instruction to begin machine learning model training. Execution of the code 136 results in the generation of model data, as described in greater detail below.

In some embodiments, the code 136 includes executable instructions that represent algorithms that define different machine learning models. For example, the code 136 includes one set of executable instructions that represent a first algorithm that defines a first machine learning model and a second set of executable instructions that represent a second algorithm that defines a second machine learning model. In some embodiments, the virtual machine instance 122 executes the code 136 and trains all of the machine learning models. In some embodiments, the virtual machine instance 122 executes the code 136, selecting one of the machine learning models to train. For example, the virtual machine instance 122 can identify a type of training data indicated by the training request and select a machine learning model to train (e.g., execute the executable instructions that represent an algorithm that defines the selected machine learning model) that corresponds with the identified type of training data.

In some embodiments, the OS 132 and the runtime 134 are the same as the OS 124 and runtime 126 utilized by the virtual machine instance 122. In some embodiments, the OS 132 and/or the runtime 134 are different than the OS 124 and/or runtime 126 utilized by the virtual machine instance 122.

In some embodiments, the model training system 120 uses one or more container images included in a training request (or a container image retrieved from the container data store 170 in response to a received training request) to create and initialize a ML training container 130 in a virtual machine instance 122. For example, the model training system 120 creates a ML training container 130 that includes the container image(s) and/or a top container layer.

Prior to beginning the training process, in some embodiments, the model training system 120 retrieves training data from the location indicated in the training request. For example, the location indicated in the training request can be a location in the training data store 160. Thus, the model training system 120 retrieves the training data from the indicated location in the training data store 160. In some embodiments, the model training system 120 does not retrieve the training data prior to beginning the training process. Rather, the model training system 120 streams the training data from the indicated location during the training process. For example, the model training system 120 can initially retrieve a portion of the training data and provide the retrieved portion to the virtual machine instance 122 training the machine learning model. Once the virtual machine instance 122 has applied and used the retrieved portion or once the virtual machine instance 122 is about to use all of the retrieved portion (e.g., a buffer storing the retrieved portion is nearly empty), then the model training system 120 can retrieve a second portion of the training data and provide the second retrieved portion to the virtual machine instance 122, and so on.

To perform the machine learning model training, the virtual machine instance 122 executes code 136 stored in the ML training container 130 in some embodiments. For example, the code 136 includes some or all of the executable instructions that form the container image of the ML training container 130 initialized therein. Thus, the virtual machine instance 122 executes some or all of the executable instructions that form the container image of the ML training container 130 initialized therein to train a machine learning model. The virtual machine instance 122 executes some or all of the executable instructions according to the hyperparameter values included in the training request. As an illustrative example, the virtual machine instance 122 trains a machine learning model by identifying values for certain parameters (e.g., coefficients, weights, centroids, etc.). The identified values depend on hyperparameters that define how the training is performed. Thus, the virtual machine instance 122 can execute the executable instructions to initiate a machine learning model training process, where the training process is run using the hyperparameter values included in the training request. Execution of the executable instructions can include the virtual machine instance 122 applying the training data retrieved by the model training system 120 as input parameters to some or all of the instructions being executed.

In some embodiments, executing the executable instructions causes the virtual machine instance 122 (e.g., the ML training container 130) to generate model data. For example, the ML training container 130 generates model data and stores the model data in a file system of the ML training container 130. The model data includes characteristics of the machine learning model being trained, such as a number of layers in the machine learning model, hyperparameters of the machine learning model, coefficients of the machine learning model, weights of the machine learning model, and/or the like. In particular, the generated model data includes values for the characteristics that define a machine learning model being trained. In some embodiments, executing the executable instructions causes a modification to the ML training container 130 such that the model data is written to the top container layer of the ML training container 130 and/or the container image(s) that forms a portion of the ML training container 130 is modified to include the model data.

The virtual machine instance 122 (or the model training system 120 itself) pulls the generated model data from the ML training container 130 and stores the generated model data in the training model data store 175 in an entry associated with the virtual machine instance 122 and/or the machine learning model being trained. In some embodiments, the virtual machine instance 122 generates a single file that includes model data and stores the single file in the training model data store 175. In some embodiments, the virtual machine instance 122 generates multiple files during the course of training a machine learning model, where each file includes model data. In some embodiments, each model data file includes the same or different model data information (e.g., one file identifies the structure of an algorithm, another file includes a list of coefficients, etc.). The virtual machine instance 122 can package the multiple files into a single file once training is complete and store the single file in the training model data store 175. Alternatively, the virtual machine instance 122 stores the multiple files in the training model data store 175. The virtual machine instance 122 stores the file(s) in the training model data store 175 while the training process is ongoing and/or after the training process is complete.

In some embodiments, the virtual machine instance 122 regularly stores model data file(s) in the training model data store 175 as the training process is ongoing. Thus, model data file(s) can be stored in the training model data store 175 at different times during the training process. Each set of model data files corresponding to a particular time or each set of model data files present in the training model data store 175 as of a particular time could be checkpoints that represent different versions of a partially trained machine learning model during different stages of the training process. Accordingly, before training is complete, a user, via the user device 102 can submit a deployment and/or execution request in a manner as described below to deploy and/or execute a version of a partially trained machine learning model (e.g., a machine learning model trained as of a certain stage in the training process). A version of a partially trained machine learning model can be based on some or all of the model data files stored in the training model data store 175.

In some embodiments, a virtual machine instance 122 executes code 136 stored in a plurality of ML training containers 130. For example, the algorithm included in the container image can be in a format that allows for the parallelization of the training process. Thus, the model training system 120 can create multiple copies of the container image provided in a training request and cause the virtual machine instance 122 to load each container image copy in a separate ML training container 130. The virtual machine instance 122 can then execute, in parallel, the code 136 stored in the ML training containers 130. The virtual machine instance 122 can further provide configuration information to each ML training container 130 (e.g., information indicating that N ML training containers 130 are collectively training a machine learning model and that a particular ML training container 130 receiving the configuration information is ML training container 130 number X of N), which can be included in the resulting model data. By parallelizing the training process, the model training system 120 can significantly reduce the training time in some embodiments.

In some embodiments, a plurality of virtual machine instances 122 execute code 136 stored in a plurality of ML training containers 130. For example, the resources used to train a particular machine learning model can exceed the limitations of a single virtual machine instance 122. However, the algorithm included in the container image can be in a format that allows for the parallelization of the training process. Thus, the model training system 120 can create multiple copies of the container image provided in a training request, initialize multiple virtual machine instances 122, and cause each virtual machine instance 122 to load a container image copy in one or more separate ML training containers 130. The virtual machine instances 122 can then each execute the code 136 stored in the ML training containers 130 in parallel. The model training system 120 can further provide configuration information to each ML training container 130 via the virtual machine instances 122 (e.g., information indicating that N ML training containers 130 are collectively training a machine learning model and that a particular ML training container 130 receiving the configuration information is ML training container 130 number X of N, information indicating that M virtual machine instances 122 are collectively training a machine learning model and that a particular ML training container 130 receiving the configuration information is initialized in virtual machine instance 122 number Y of M, etc.), which can be included in the resulting model data. As described above, by parallelizing the training process, the model training system 120 can significantly reduce the training time in some embodiments.

In some embodiments, the model training system 120 includes a plurality of physical computing devices and two or more of the physical computing devices hosts one or more virtual machine instances 122 that execute the code 136. Thus, the parallelization can occur over different physical computing devices in addition to over different virtual machine instances 122 and/or ML training containers 130.

In some embodiments, the model training system 120 includes a ML model evaluator 128. The ML model evaluator 128 can monitor virtual machine instances 122 as machine learning models are being trained, obtaining the generated model data and processing the obtained model data to generate model metrics. For example, the model metrics can include quality metrics, such as an error rate of the machine learning model being trained, a statistical distribution of the machine learning model being trained, a latency of the machine learning model being trained, a confidence level of the machine learning model being trained (e.g., a level of confidence that the accuracy of the machine learning model being trained is known, etc. The ML model evaluator 128 can obtain the model data for a machine learning model being trained and evaluation data from the training data store 160. The evaluation data is separate from the data used to train a machine learning model and includes both input data and expected outputs (e.g., known results), and thus the ML model evaluator 128 can define a machine learning model using the model data and execute the machine learning model by providing the input data as inputs to the machine learning model. The ML model evaluator 128 can then compare the outputs of the machine learning model to the expected outputs, and determine one or more quality metrics of the machine learning model being trained based on the comparison (e.g., the error rate can be a difference or distance between the machine learning model outputs and the expected outputs).

The ML model evaluator 128 periodically generates model metrics during the training process and stores the model metrics in the training metrics data store 165 in some embodiments. While the machine learning model is being trained, a user, via the user device 102, can access and retrieve the model metrics from the training metrics data store 165. The user can then use the model metrics to determine whether to adjust the training process and/or to stop the training process. For example, the model metrics can indicate that the machine learning model is performing poorly (e.g., has an error rate above a threshold value, has a statistical distribution that is not an expected or desired distribution (e.g., not a binomial distribution, a Poisson distribution, a geometric distribution, a normal distribution, Gaussian distribution, etc.), has an execution latency above a threshold value, has a confidence level below a threshold value)) and/or is performing progressively worse (e.g., the quality metric continues to worsen over time). In response, in some embodiments, the user, via the user device 102, can transmit a request to the model training system 120 to modify the machine learning model being trained (e.g., transmit a modification request). The request can include a new or modified container image, a new or modified algorithm, new or modified hyperparameter(s), and/or new or modified information describing the computing machine on which to train a machine learning model. The model training system 120 can modify the machine learning model accordingly. For example, the model training system 120 can cause the virtual machine instance 122 to optionally delete an existing ML training container 130, create and initialize a new ML training container 130 using some or all of the information included in the request, and execute the code 136 stored in the new ML training container 130 to restart the machine learning model training process. As another example, the model training system 120 can cause the virtual machine instance 122 to modify the execution of code stored in an existing ML training container 130 according to the data provided in the modification request. In some embodiments, the user, via the user device 102, can transmit a request to the model training system 120 to stop the machine learning model training process. The model training system 120 can then instruct the virtual machine instance 122 to delete the ML training container 130 and/or to delete any model data stored in the training model data store 175.

As described below, in some embodiments, the model data stored in the training model data store 175 is used by the model hosting system 140 to deploy machine learning models. Alternatively or in addition, a user device 102 or another computing device (not shown) can retrieve the model data from the training model data store 175 to implement a learning algorithm in an external device. As an illustrative example, a robotic device can include sensors to capture input data. A user device 102 can retrieve the model data from the training model data store 175 and store the model data in the robotic device. The model data defines a machine learning model. Thus, the robotic device can provide the captured input data as an input to the machine learning model, resulting in an output. The robotic device can then perform an action (e.g., move forward, raise an arm, generate a sound, etc.) based on the resulting output.

While the virtual machine instances 122 are shown in FIG. 1 as a single grouping of virtual machine instances 122, some embodiments of the present application separate virtual machine instances 122 that are actively assigned to execute tasks from those virtual machine instances 122 that are not actively assigned to execute tasks. For example, those virtual machine instances 122 actively assigned to execute tasks are grouped into an "active pool," while those virtual machine instances 122 not actively assigned to execute tasks are placed within a "warming pool." In some embodiments, those virtual machine instances 122 within the warming pool can be pre-initialized with an operating system, language runtimes, and/or other software required to enable rapid execution of tasks (e.g., rapid initialization of machine learning model training in ML training container(s) 130) in response to training requests.

In some embodiments, the model training system 120 includes a processing unit, a network interface, a computer-readable medium drive, and an input/output device interface, all of which can communicate with one another by way of a communication bus. The network interface can provide connectivity to one or more networks or computing systems. The processing unit can thus receive information and instructions from other computing systems or services (e.g., user devices 102, the model hosting system 140, etc.). The processing unit can also communicate to and from a memory of a virtual machine instance 122 and further provide output information for an optional display via the input/output device interface. The input/output device interface can also accept input from an optional input device. The memory can contain computer program instructions (grouped as modules in some embodiments) that the processing unit executes in order to implement one or more aspects of the present disclosure.

Example Model Hosting System

In some embodiments, the model hosting system 140 includes a single physical computing device or multiple physical computing devices that are interconnected using one or more computing networks (not shown), where the physical computing device(s) host one or more virtual machine instances 142. The model hosting system 140 can handle the acquisition and configuration of compute capacity (e.g., containers, instances, etc.) based on demand for the execution of trained machine learning models. The model hosting system 140 can then execute machine learning models using the compute capacity, as is described in greater detail below. The model hosting system 140 can automatically scale up and down based on the volume of execution requests received from user devices 102 via frontend 149 of the model hosting system 140, thereby relieving the user from the burden of having to worry about over-utilization (e.g., acquiring too little computing resources and suffering performance issues) or under-utilization (e.g., acquiring more computing resources than necessary to run the machine learning models, and thus overpaying).

In some embodiments, the virtual machine instances 142 are utilized to execute tasks. For example, such tasks can include executing a machine learning model. As shown in FIG. 1, each virtual machine instance 142 includes an operating system (OS) 144, a language runtime 146, and one or more ML scoring containers 150. The ML scoring containers 150 are similar to the ML training containers 130 in that the ML scoring containers 150 are logical units created within a virtual machine instance using the resources available on that instance, and can be utilized to isolate execution of a task from other processes (e.g., task executions) occurring in the instance. In some embodiments, the ML scoring containers 150 are formed from one or more container images and a top container layer. Each container image further includes one or more image layers, where each image layer represents an executable instruction. As described above, some or all of the executable instructions together represent an algorithm that defines a machine learning model. Changes made to the ML scoring containers 150 (e.g., creation of new files, modification of existing files, deletion of files, etc.) are stored in the top container layer. If a ML scoring container 150 is deleted, the top container layer is also deleted. However, the container image(s) that form a portion of the deleted ML scoring container 150 can remain unchanged. The ML scoring containers 150 can be implemented, for example, as Linux containers.

The ML scoring containers 150 each include individual copies of an OS 152, runtime 154, and code 156 in some embodiments. The OS 152 and/or the runtime 154 can be defined by one or more executable instructions that form at least a portion of a container image that is used to form the ML scoring container 150 (e.g., the executable instruction(s) in the container image that define the operating system and/or runtime to run in the container formed from the container image). The code 156 includes one or more executable instructions that form at least a portion of a container image that is used to form the ML scoring container 150. For example, the code 156 includes the executable instructions in the container image that represent an algorithm that defines a machine learning model. The code 156 can also include model data that represent characteristics of the defined machine learning model, as described in greater detail below. The OS 152 and/or runtime 154 are configured to execute the code 156 in response to an instruction to begin execution of a machine learning model. Execution of the code 156 results in the generation of outputs (e.g., predicted results), as described in greater detail below.

In some embodiments, the OS 152 and the runtime 154 are the same as the OS 144 and runtime 146 utilized by the virtual machine instance 142. In some embodiments, the OS 152 and/or the runtime 154 are different than the OS 144 and/or runtime 146 utilized by the virtual machine instance 142.

In some embodiments, the model hosting system 140 uses one or more container images included in a deployment request (or a container image retrieved from the container data store 170 in response to a received deployment request) to create and initialize a ML scoring container 150 in a virtual machine instance 142. For example, the model hosting system 140 creates a ML scoring container 150 that includes the container image(s) and/or a top container layer.

As described above, a user device 102 can submit a deployment request and/or an execution request to the model hosting system 140 via the frontend 149 in some embodiments. A deployment request causes the model hosting system 140 to deploy a trained machine learning model into a virtual machine instance 142. For example, the deployment request can include an identification of an endpoint (e.g., an endpoint name, such as a hypertext transfer protocol (HTTP) endpoint name) and an identification of one or more trained machine learning models (e.g., a location of one or more model data files stored in the training model data store 175). Optionally, the deployment request also includes an identification of one or more container images stored in the container data store 170.

Upon receiving the deployment request, the model hosting system 140 initializes ones or more ML scoring containers 150 in one or more hosted virtual machine instance 142. In embodiments in which the deployment request includes an identification of one or more container images, the model hosting system 140 forms the ML scoring container(s) 150 from the identified container image(s). For example, a container image identified in a deployment request can be the same container image used to form an ML training container 130 used to train the machine learning model corresponding to the deployment request. Thus, the code 156 of the ML scoring container(s) 150 includes one or more executable instructions in the container image(s) that represent an algorithm that defines a machine learning model. In embodiments in which the deployment request does not include an identification of a container image, the model hosting system 140 forms the ML scoring container(s) 150 from one or more container images stored in the container data store 170 that are appropriate for executing the identified trained machine learning model(s). For example, an appropriate container image can be a container image that includes executable instructions that represent an algorithm that defines the identified trained machine learning model(s).

The model hosting system 140 further forms the ML scoring container(s) 150 by retrieving model data corresponding to the identified trained machine learning model(s) in some embodiments. For example, the deployment request can identify a location of model data file(s) stored in the training model data store 175. In embodiments in which a single model data file is identified in the deployment request, the model hosting system 140 retrieves the identified model data file from the training model data store 175 and inserts the model data file into a single ML scoring container 150, which forms a portion of code 156. In some embodiments, the model data file is archived or compressed (e.g., formed from a package of individual files). Thus, the model hosting system 140 unarchives or decompresses the model data file to obtain multiple individual files, and inserts the individual files into the ML scoring container 150. In some embodiments, the model hosting system 140 stores the model data file in the same location as the location in which the model data file was stored in the ML training container 130 that generated the model data file. For example, the model data file initially was stored in the top container layer of the ML training container 130 at a certain offset, and the model hosting system 140 then stores the model data file in the top container layer of the ML scoring container 150 at the same offset.

In embodiments in which multiple model data files are identified in the deployment request, the model hosting system 140 retrieves the identified model data files from the training model data store 175. The model hosting system 140 can insert the model data files into the same ML scoring container 150, into different ML scoring containers 150 initialized in the same virtual machine instance 142, or into different ML scoring containers 150 initialized in different virtual machine instances 142. As an illustrative example, the deployment request can identify multiple model data files corresponding to different trained machine learning models because the trained machine learning models are related (e.g., the output of one trained machine learning model is used as an input to another trained machine learning model). Thus, the user may desire to deploy multiple machine learning models to eventually receive a single output that relies on the outputs of multiple machine learning models.

In some embodiments, the model hosting system 140 associates the initialized ML scoring container(s) 150 with the endpoint identified in the deployment request. For example, each of the initialized ML scoring container(s) 150 can be associated with a network address. The model hosting system 140 can map the network address(es) to the identified endpoint, and the model hosting system 140 or another system (e.g., a routing system, not shown) can store the mapping. Thus, a user device 102 can refer to trained machine learning model(s) stored in the ML scoring container(s) 150 using the endpoint. This allows for the network address of an ML scoring container 150 to change without causing the user operating the user device 102 to change the way in which the user refers to a trained machine learning model.

Once the ML scoring container(s) 150 are initialized, the ML scoring container(s) 150 are ready to execute trained machine learning model(s). In some embodiments, the user device 102 transmits an execution request to the model hosting system 140 via the frontend 149, where the execution request identifies an endpoint and includes an input to a machine learning model (e.g., a set of input data). The model hosting system 140 or another system (e.g., a routing system, not shown) can obtain the execution request, identify the ML scoring container(s) 150 corresponding to the identified endpoint, and route the input to the identified ML scoring container(s) 150.

In some embodiments, a virtual machine instance 142 executes the code 156 stored in an identified ML scoring container 150 in response to the model hosting system 140 receiving the execution request. In particular, execution of the code 156 causes the executable instructions in the code 156 corresponding to the algorithm to read the model data file stored in the ML scoring container 150, use the input included in the execution request as an input parameter, and generate a corresponding output. As an illustrative example, the algorithm can include coefficients, weights, layers, cluster centroids, and/or the like. The executable instructions in the code 156 corresponding to the algorithm can read the model data file to determine values for the coefficients, weights, layers, cluster centroids, and/or the like. The executable instructions can include input parameters, and the input included in the execution request can be supplied by the virtual machine instance 142 as the input parameters. With the machine learning model characteristics and the input parameters provided, execution of the executable instructions by the virtual machine instance 142 can be completed, resulting in an output.

In some embodiments, the virtual machine instance 142 stores the output in the model prediction data store 180. Alternatively or in addition, the virtual machine instance 142 transmits the output to the user device 102 that submitted the execution result via the frontend 149.

In some embodiments, the execution request corresponds to a group of related trained machine learning models. Thus, the ML scoring container 150 can transmit the output to a second ML scoring container 150 initialized in the same virtual machine instance 142 or in a different virtual machine instance 142. The virtual machine instance 142 that initialized the second ML scoring container 150 can then execute second code 156 stored in the second ML scoring container 150, providing the received output as an input parameter to the executable instructions in the second code 156. The second ML scoring container 150 further includes a model data file stored therein, which is read by the executable instructions in the second code 156 to determine values for the characteristics defining the machine learning model. Execution of the second code 156 results in a second output. The virtual machine instance 142 that initialized the second ML scoring container 150 can then transmit the second output to the model prediction data store 180 and/or the user device 102 via the frontend 149 (e.g., if no more trained machine learning models are needed to generate an output) or transmit the second output to a third ML scoring container 150 initialized in the same or different virtual machine instance 142 (e.g., if outputs from one or more additional trained machine learning models are needed), and the above-referenced process can be repeated with respect to the third ML scoring container 150.

While the virtual machine instances 142 are shown in FIG. 1 as a single grouping of virtual machine instances 142, some embodiments of the present application separate virtual machine instances 142 that are actively assigned to execute tasks from those virtual machine instances 142 that are not actively assigned to execute tasks. For example, those virtual machine instances 142 actively assigned to execute tasks are grouped into an "active pool," while those virtual machine instances 142 not actively assigned to execute tasks are placed within a "warming pool." In some embodiments, those virtual machine instances 142 within the warming pool can be pre-initialized with an operating system, language runtimes, and/or other software required to enable rapid execution of tasks (e.g., rapid initialization of ML scoring container(s) 150, rapid execution of code 156 in ML scoring container(s), etc.) in response to deployment and/or execution requests.

In some embodiments, the model hosting system 140 includes a processing unit, a network interface, a computer-readable medium drive, and an input/output device interface, all of which can communicate with one another by way of a communication bus. The network interface can provide connectivity to one or more networks or computing systems. The processing unit can thus receive information and instructions from other computing systems or services (e.g., user devices 102, the model training system 120, etc.). The processing unit can also communicate to and from a memory of a virtual machine instance 142 and further provide output information for an optional display via the input/output device interface. The input/output device interface can also accept input from an optional input device. The memory can contain computer program instructions (grouped as modules in some embodiments) that the processing unit executes in order to implement one or more aspects of the present disclosure.

Additional Embodiments of the Example Training and Hosting Environment

In some embodiments, the operating environment 100 supports many different types of machine learning models, such as multi arm bandit models, reinforcement learning models, ensemble machine learning models, deep learning models, and/or the like.

The model training system 120 and the model hosting system 140 depicted in FIG. 1 are not meant to be limiting.

For example, the model training system 120 and/or the model hosting system 140 could also operate within a computing environment having a fewer or greater number of devices than are illustrated in FIG. 1. Thus, the depiction of the model training system 120 and/or the model hosting system 140 in FIG. 1 may be taken as illustrative and not limiting to the present disclosure. For example, the model training system 120 and/or the model hosting system 140 or various constituents thereof could implement various Web services components, hosted or "cloud" computing environments, and/or peer-to-peer network configurations to implement at least a portion of the processes described herein. In some embodiments, the model training system 120 and/or the model hosting system 140 are implemented directly in hardware or software executed by hardware devices and may, for instance, include one or more physical or virtual servers implemented on physical computer hardware configured to execute computer-executable instructions for performing the various features that are described herein. The one or more servers can be geographically dispersed or geographically co-located, for instance, in one or more points of presence (POPs) or regional data centers.

The frontend 129 processes all training requests received from user devices 102 and provisions virtual machine instances 122. In some embodiments, the frontend 129 serves as a front door to all the other services provided by the model training system 120. The frontend 129 processes the requests and makes sure that the requests are properly authorized. For example, the frontend 129 may determine whether the user associated with the training request is authorized to initiate the training process.

Similarly, frontend 149 processes all deployment and execution requests received from user devices 102 and provisions virtual machine instances 142. In some embodiments, the frontend 149 serves as a front door to all the other services provided by the model hosting system 140. The frontend 149 processes the requests and makes sure that the requests are properly authorized. For example, the frontend 149 may determine whether the user associated with a deployment request or an execution request is authorized to access the indicated model data and/or to execute the indicated machine learning model.

The training data store 160 stores training data and/or evaluation data. The training data can be data used to train machine learning models and evaluation data can be data used to evaluate the performance of machine learning models. In some embodiments, the training data and the evaluation data have common data. In some embodiments, the training data and the evaluation data do not have common data. In some embodiments, the training data includes input data and expected outputs. While the training data store 160 is depicted as being located external to the model training system 120 and the model hosting system 140, this is not meant to be limiting. For example, in some embodiments not shown, the training data store 160 is located internal to at least one of the model training system 120 or the model hosting system 140.

In some embodiments, the training metrics data store 165 stores model metrics. While the training metrics data store 165 is depicted as being located external to the model training system 120 and the model hosting system 140, this is not meant to be limiting. For example, in some embodiments not shown, the training metrics data store 165 is located internal to at least one of the model training system 120 or the model hosting system 140.

The container data store 170 stores container images, such as container images used to form ML training containers 130 and/or ML scoring containers 150, that can be retrieved by various virtual machine instances 122 and/or 142. While the container data store 170 is depicted as being located external to the model training system 120 and the model hosting system 140, this is not meant to be limiting. For example, in some embodiments not shown, the container data store 170 is located internal to at least one of the model training system 120 and the model hosting system 140.

The training model data store 175 stores model data files. In some embodiments, some of the model data files are comprised of a single file, while other model data files are packages of multiple individual files. While the training model data store 175 is depicted as being located external to the model training system 120 and the model hosting system 140, this is not meant to be limiting. For example, in some embodiments not shown, the training model data store 175 is located internal to at least one of the model training system 120 or the model hosting system 140.

The model prediction data store 180 stores outputs (e.g., execution results) generated by the ML scoring containers 150 in some embodiments. While the model prediction data store 180 is depicted as being located external to the model training system 120 and the model hosting system 140, this is not meant to be limiting. For example, in some embodiments not shown, the model prediction data store 180 is located internal to at least one of the model training system 120 and the model hosting system 140.

While the model training system 120, the model hosting system 140, the training data store 160, the training metrics data store 165, the container data store 170, the training model data store 175, and the model prediction data store 180 are illustrated as separate components, this is not meant to be limiting. In some embodiments, any one or all of these components can be combined to perform the functionality described herein. For example, any one or all of these components can be implemented by a single computing device, or by multiple distinct computing devices, such as computer servers, logically or physically grouped together to collectively operate as a server system. Any one or all of these components can communicate via a shared internal network, and the collective system (e.g., also referred to herein as a machine learning service) can communicate with one or more of the user devices 102 via the network 110.

Various example user devices 102 are shown in FIG. 1, including a desktop computer, laptop, and a mobile phone, each provided by way of illustration. In general, the user devices 102 can be any computing device such as a desktop, laptop or tablet computer, personal computer, wearable computer, server, personal digital assistant (PDA), hybrid PDA/mobile phone, mobile phone, electronic book reader, set-top box, voice command device, camera, digital media player, and the like. In some embodiments, the model training system 120 and/or the model hosting system 140 provides the user devices 102 with one or more user interfaces, command-line interfaces (CLI), application programming interfaces (API), and/or other programmatic interfaces for submitting training requests, deployment requests, and/or execution requests. In some embodiments, the user devices 102 can execute a stand-alone application that interacts with the model training system 120 and/or the model hosting system 140 for submitting training requests, deployment requests, and/or execution requests.

In some embodiments, the network 110 includes any wired network, wireless network, or combination thereof. For example, the network 110 may be a personal area network, local area network, wide area network, over-the-air broadcast network (e.g., for radio or television), cable network, satellite network, cellular telephone network, or combination thereof. As a further example, the network 110 may be a publicly accessible network of linked networks, possibly operated by various distinct parties, such as the Internet. In some embodiments, the network 110 may be a private or semi-private network, such as a corporate or university intranet. The network 110 may include one or more wireless networks, such as a Global System for Mobile Communications (GSM) network, a Code Division Multiple Access (CDMA) network, a Long Term Evolution (LTE) network, or any other type of wireless network. The network 110 can use protocols and components for communicating via the Internet or any of the other aforementioned types of networks. For example, the protocols used by the network 110 may include Hypertext Transfer Protocol (HTTP), HTTP Secure (HTTPS), Message Queue Telemetry Transport (MQTT), Constrained Application Protocol (CoAP), and the like. Protocols and components for communicating via the Internet or any of the other aforementioned types of communication networks are well known to those skilled in the art and, thus, are not described in more detail herein.

Example Block Diagram for Training a Machine Learning Model

Figure 2:
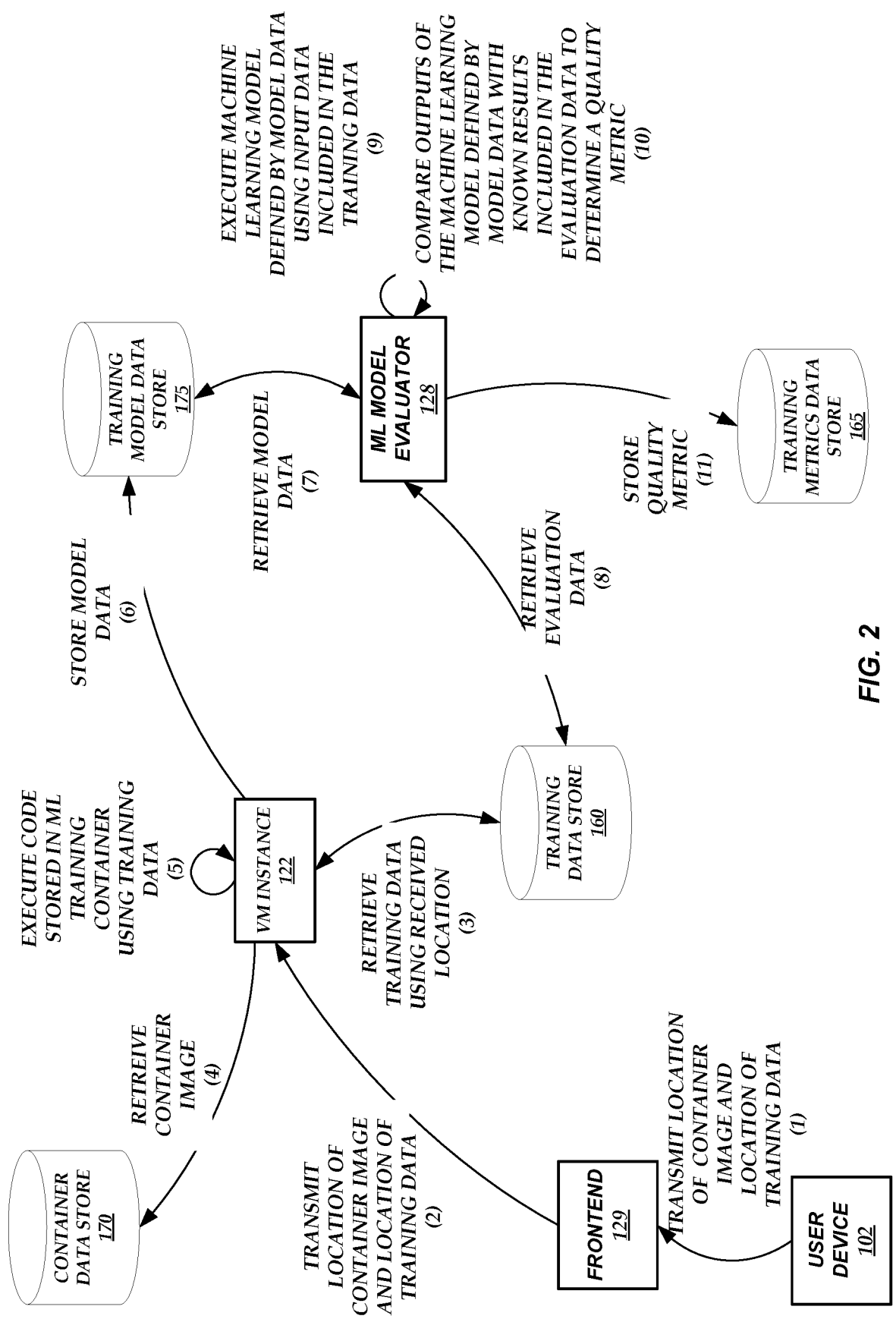
FIG. 2 is a block diagram of the operating environment of FIG. 1 illustrating the operations performed by the components of the operating environment to train a machine learning model, according to some embodiments.

FIG. 2 is a block diagram of the operating environment 100 of FIG. 1 illustrating the operations performed by the components of the operating environment 100 to train a machine learning model, according to some embodiments. As illustrated in FIG. 2, the user device 102 transmits a location of a container image and a location of training data to the frontend 129 at (1). The frontend 129 then causes a virtual machine instance 122 to be initialized and forwards the container image location and the training data location to the initialized virtual machine instance 122 at (2). In some embodiments, the container image location and the training data location are transmitted as part of a training request.

In some embodiments, the virtual machine instance 122 retrieves training data from the training data store 160 using the received location at (3). Before, during, or after retrieving the training data, the virtual machine instance 122 retrieves the container image from the container data store 170 using the received location at (4).

The virtual machine instance 122 initializes an ML training container within the virtual machine instance 122 using the received container image in some embodiments. The virtual machine instance 122 then executes code stored in the ML training container using the retrieved training data at (5) to train a machine learning model. For example, the code can include executable instructions originating in the container image that represent an algorithm that defines a machine learning model that is yet to be trained. The virtual machine instance 122 executes the code according to hyperparameter values that are provided by the user device 102.

Executing the executable instructions causes the ML training container to generate model data that includes characteristics of the machine learning model being trained. The virtual machine instance 122 stores the model data in the training model data store 175 at (6) in some embodiments. In some embodiments, the virtual machine instance 122 generates multiple model data files that are packaged into a single file stored in the training model data store 175.

During the machine learning model training process, the ML model evaluator 128 can retrieve the model data from the training model data store 175 at (7). The ML model evaluator 128 further retrieves evaluation data from the training data store 160 at (8). For example, the evaluation data can be data that is separate from the data used to train machine learning models. The evaluation data can include input data and known results that occurred or were formed as a result of the input data. In some embodiments, the ML model evaluator 128 executes a machine learning model defined by the retrieved model data using input data included in the evaluation data at (9). The ML model evaluator 128 then compares outputs of the machine learning model defined by the retrieved model data with known results included in the evaluation data to determine a quality metric of the machine learning model at (10). For example, the quality metric can be determined based on an aggregated difference (e.g., average difference, median difference, etc.) between the machine learning model outputs and the known results. The ML model evaluator 128 can then store the quality metric in the training metrics data store 165 at (11).

In some embodiments, the ML model evaluator 128 also stores additional information in the training metrics data store 165. For example, the ML model evaluator 128 can store the input data (or tags that represent the input data), the machine learning model outputs, and the known results. Thus, a user, via the user device 102, can not only identify the quality metric(s), but can also identify which inputs resulted in small or no differences between machine learning model outputs and known results, which inputs resulted in large differences between machine learning model outputs and known results, etc.

Example Block Diagram for Modifying Machine Learning Model Training

Figure 3:
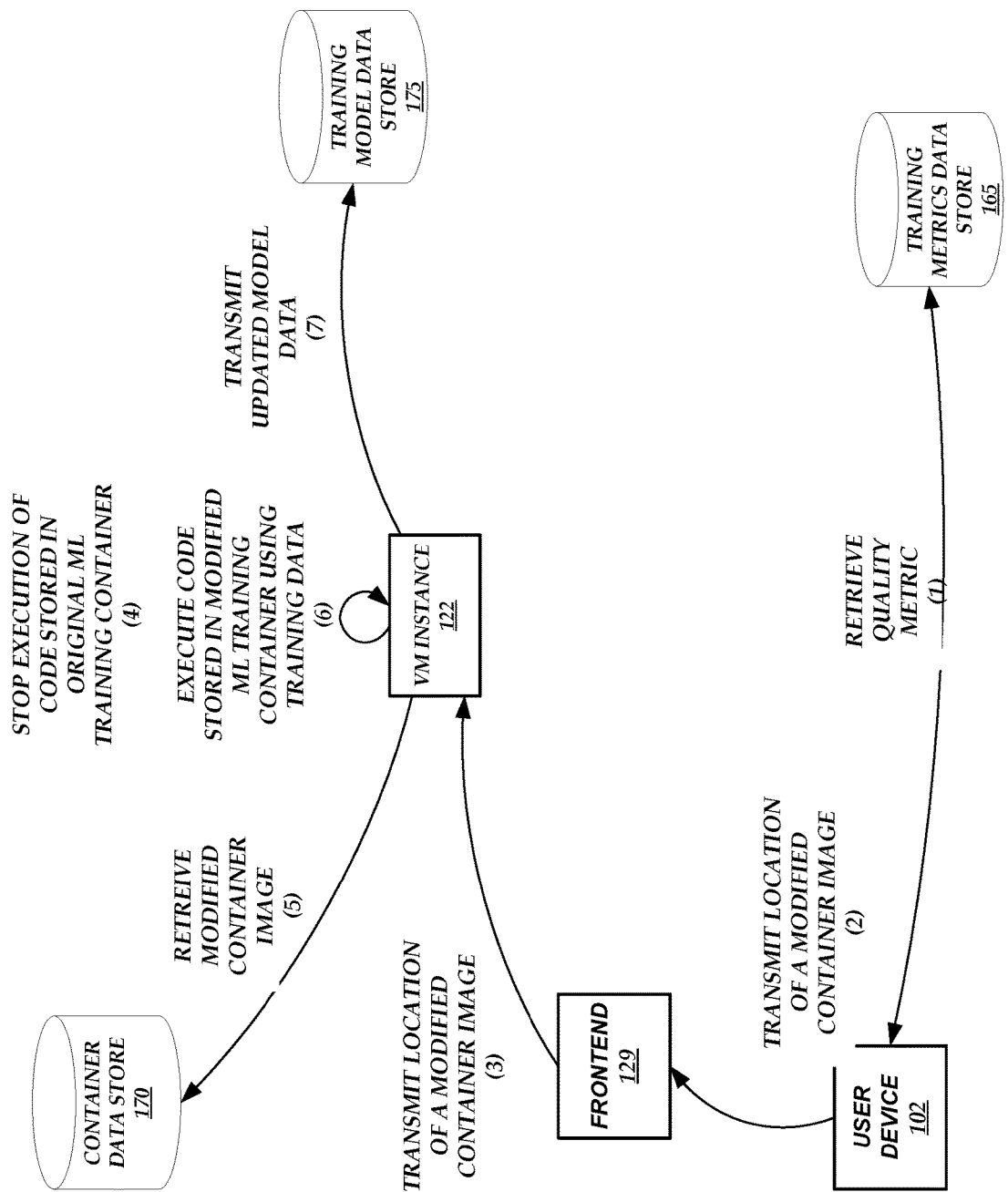
FIG. 3 is a block diagram of the operating environment of FIG. 1 illustrating the operations performed by the components of the operating environment to modifying machine learning model training, according to some embodiments.

FIG. 3 is a block diagram of the operating environment 100 of FIG. 1 illustrating the operations performed by the components of the operating environment 100 to modifying machine learning model training, according to some embodiments. As illustrated in FIG. 3, the user device 102 retrieves a quality metric stored in the training metrics data store 165 at (1). In some embodiments, a user, via the user device 102, retrieves the quality metric to determine the accuracy of a machine learning model still being trained.

In some embodiments, the user device 102 transmits a location of a modified container image to the frontend 129 at (2). The frontend 129 then forwards the location of modified container image to the virtual machine instance 122 at (3). The user device 102 can transmit the modified container image as part of a modification request to modify the machine learning model being trained. In response, the virtual machine instance 122 stops execution of the code stored in the original ML training container formed from the original container image at (4). The virtual machine instance 122 then retrieves the modified container image from the container data store 170 at (5) using the received location. The virtual machine instance 122 can then form a modified ML training container from the modified container image, and execute code stored in the modified ML training container using previously retrieved training data at (6) to re-train a machine learning model.

Execution of the code causes the modified ML training container to generate updated model data, which the virtual machine instance 122 then stores in the training model data store 175 at (7). In some embodiments, not shown, the virtual machine instance 122 causes the training model data store 175 to delete any model data stored as a result of training performed using the original ML training container.

In some embodiments, not shown, while the user desires to modify a machine learning model being trained, the user, via the user device 102, does not provide a location of a modified container image because the user does not want to initialize a new ML training container. Rather, the user desires to modify the existing ML training container at runtime so that the machine learning model can be modified without re-starting the training process. Thus, the user device 102 instead provides code that the virtual machine instance 122 adds to the existing ML training container (or uses to replace other code already existing in the ML training container). For example, the original container image used to form the existing ML training container can include executable instructions that are constructed such that the executable instructions retrieve and execute additional code when executed. Such additional code can be provided by the user device 102 in conjunction with the container image (e.g., when the ML training container is initialized) and/or after the virtual machine instance 122 has already begun to execute code stored within the ML training container. In this embodiment, the container image, together with the additional code, form a complete ML training container.

Example Block Diagram for Parallelized Machine Learning Model Training

Figure 4:
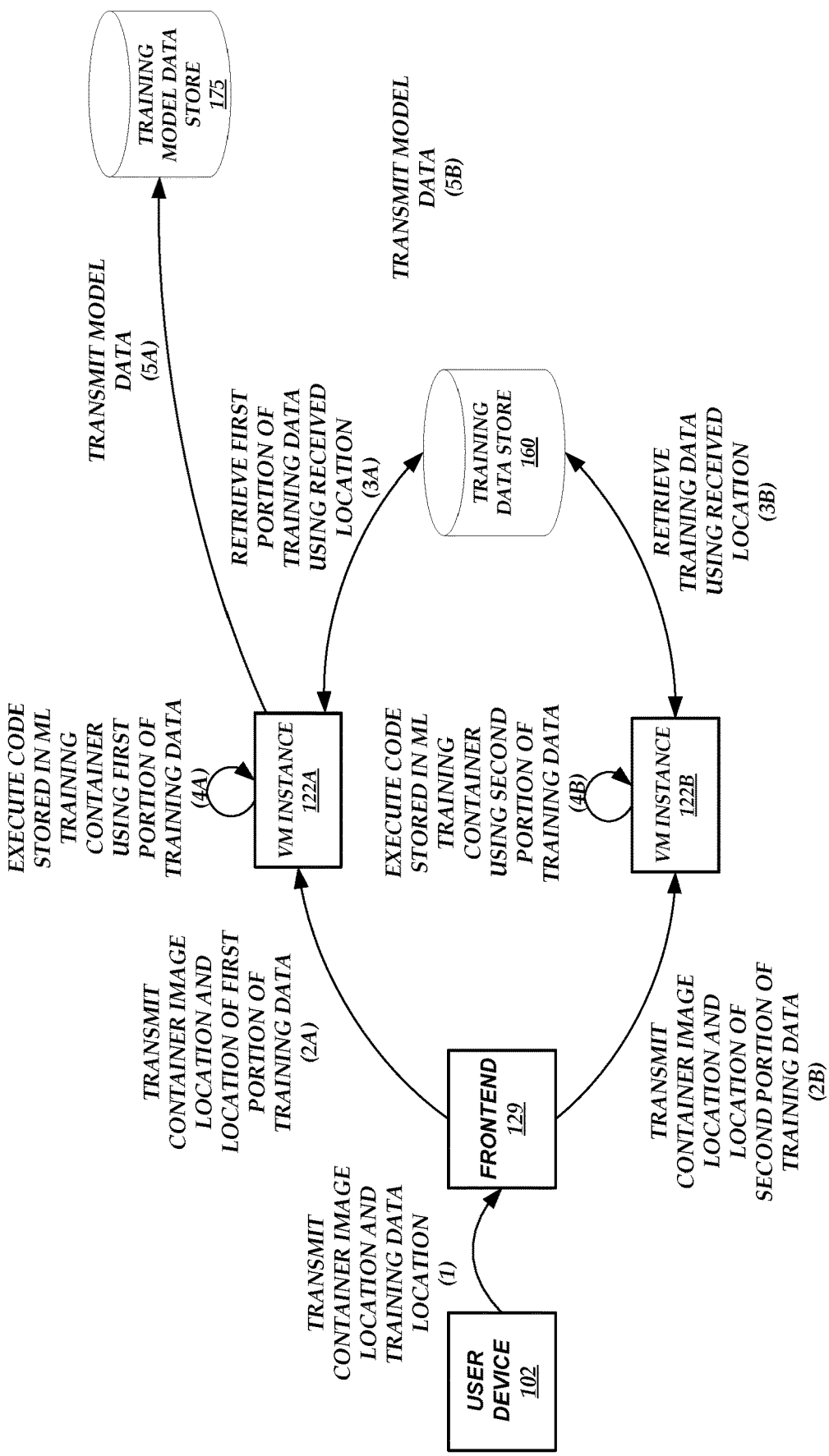
FIG. 4 is a block diagram of the operating environment of FIG. 1 illustrating the operations performed by the components of the operating environment to parallelize the machine learning model training process, according to some embodiments.

FIG. 4 is a block diagram of the operating environment 100 of FIG. 1 illustrating the operations performed by the components of the operating environment 100 to parallelize the machine learning model training process, according to some embodiments. As illustrated in FIG. 4, user device 102 transmits a container image location and a training data location to the frontend 129 at (1). In response, the frontend 129 initializes a first virtual machine instance 122A and a second virtual machine instance 122B such that the first virtual machine instance 122A can perform a partial training of a machine learning model using a first portion of the training data and the second virtual machine instance 122B can perform a partial training of the machine learning model using a second portion of the training data. The frontend 129 then transmits the container image location and the location of a first portion of the training data to the virtual machine instance 122A at (2A). Before, during, or after transmitting the container image location and the location of the first portion of the training data to the virtual machine instance 122A, the frontend 129 transmits the container image location and the location of a second portion of the training data to the virtual machine instance 122B at (2B). In some embodiments, the container image location and the training data location are transmitted as part of training requests.

In some embodiments, the virtual machine instance 122A retrieves the first portion of the training data from the training data store 160 using the received location at (3A). Before, during, or after the virtual machine instance 122A retrieves the first portion of the training data, the virtual machine instance 122B retrieves the second portion of the training data from the training data store 160 using the received location at (3B). In some embodiments, not shown, the virtual machine instances 122A-122B retrieve the same training data.

The virtual machine instance 122A then forms an ML training container using a container image retrieved from the indicated location in some embodiments, and executes code stored in the ML training container using the retrieved first portion of the training data at (4A). Before, during, or after the virtual machine instance 122A executes the code, the virtual machine instance 122B forms an ML training container using a container image retrieved from the indicated location and executes code stored in the ML training container using the retrieved second portion of the training data at (4B). Thus, the virtual machine instances 122A-122B each include a copy of the same ML training container.

Executing the code causes the virtual machine instances 122A-122B (e.g., the ML training containers included therein) to generate model data. Thus, the virtual machine instance 122A transmits model data to the training model data store 175 at (5A) and the virtual machine instance 122B transmits model data to the training model data store 175 at (5B). In some embodiments, not shown, the model data generated by each virtual machine instance 122A-122B is packaged into a single model data file (e.g., by the training model data store 175).

In some embodiments, the virtual machine instances 122A-122B communicate with each other during the machine learning model training. For example, the virtual machine instances 122A-122B can share coefficients, weights, training strategies, and/or the like during the training process.

Example Block Diagram for Deploying and Executing a Machine Learning Model

Figure 5A:
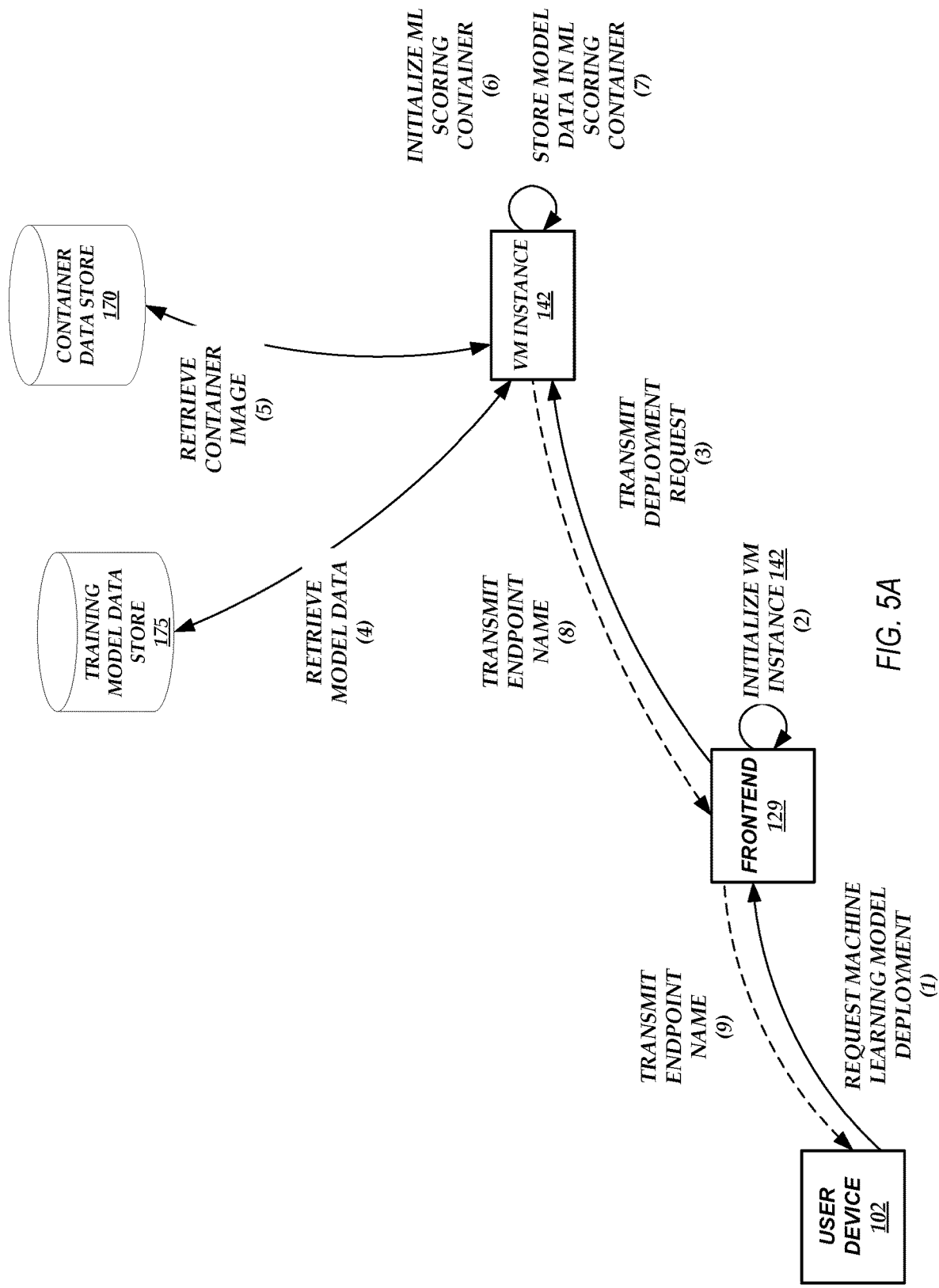
FIG. 5A is a block diagram of the operating environment of FIG. 1 illustrating the operations performed by the components of the operating environment to deploy a trained machine learning model, according to some embodiments.

FIG. 5A is a block diagram of the operating environment 100 of FIG. 1 illustrating the operations performed by the components of the operating environment 100 to deploy a trained machine learning model, according to some embodiments. As illustrated in FIG. 5A, user device 102 transmits a machine learning model deployment request to the frontend 149 at (1). The frontend 149 can initialize a virtual machine instance 142 at (2) and transmit the deployment request to the virtual machine instance 142 at (3). The deployment request includes a location of one or more model data files stored in the training model data store 175. In some embodiments, the deployment request includes an endpoint name. In some embodiments, the deployment request does not include an endpoint name.

In some embodiments, the virtual machine instance 142 retrieves model data from the training model data store 175 at (4). For example, the virtual machine instance 142 retrieves the model data corresponding to the location identified in the deployment request. In some embodiments, not shown, the virtual machine instance 142 does not retrieve the model data. Rather, the model data can be embedded in the container image retrieved by the virtual machine instance 142. The virtual machine instance 142 also retrieves a container image from the container data store 170 at (5). The container image can correspond to a container image identified in the deployment request.

The virtual machine instance 142 can initialize an ML scoring container at (6) in some embodiments. For example, the virtual machine instance 142 can form the ML scoring container using the retrieved container image. The virtual machine instance 142 can further store the model data in the ML scoring container (e.g., in a location that is the same as the location in which the model data is stored in an ML training container 130 when a machine learning model is trained) at (7).

In some embodiments, if the deployment request did not include an endpoint name, the virtual machine instance 142 can transmit an endpoint name to the frontend 149 at (8). The frontend 149 can then forward the endpoint name to the user device 102 at (9). Thus, the user device 102 can use the endpoint name to access the initialized ML scoring container in the future (e.g., to submit a machine learning model execution request).

Figure 5B:
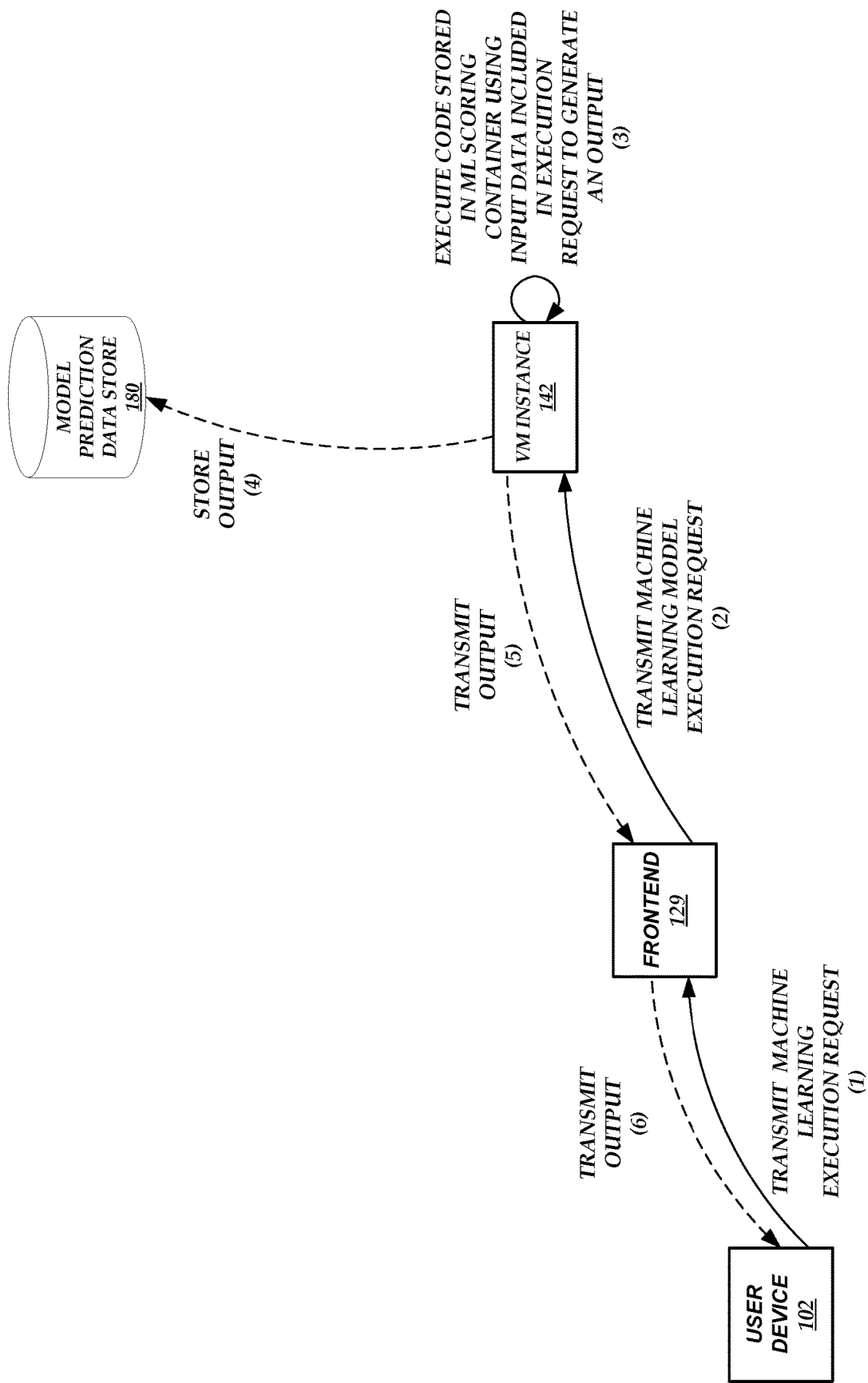
FIG. 5B is a block diagram of the operating environment of FIG. 1 illustrating the operations performed by the components of the operating environment to execute a trained machine learning model, according to some embodiments.

FIG. 5B is a block diagram of the operating environment 100 of FIG. 1 illustrating the operations performed by the components of the operating environment 100 to execute a trained machine learning model, according to some embodiments. As illustrated in FIG. 5B, user device 102 transmits a machine learning model execution request to the frontend 149 at (1). The frontend 149 then forwards the execution request to the virtual machine instance 142 at (2). In some embodiments, the execution request includes an endpoint name, which the model hosting system 140 uses to route the execution request to the appropriate virtual machine instance 142.

In some embodiments, the virtual machine instance 142 executes code stored in an ML scoring container initialized in the virtual machine instance 142 using input data included in the execution request to generate an output at (3). In some embodiments, the virtual machine instance 142 stores the output in the model prediction data store 180 at (4). Alternatively or in addition, the virtual machine instance 142 transmits the output to the frontend 149 at (5), and the frontend 149 transmits the output to the user device 102 at (6).

Example Block Diagram for Executing Related Machine Learning Models

Figure 6:
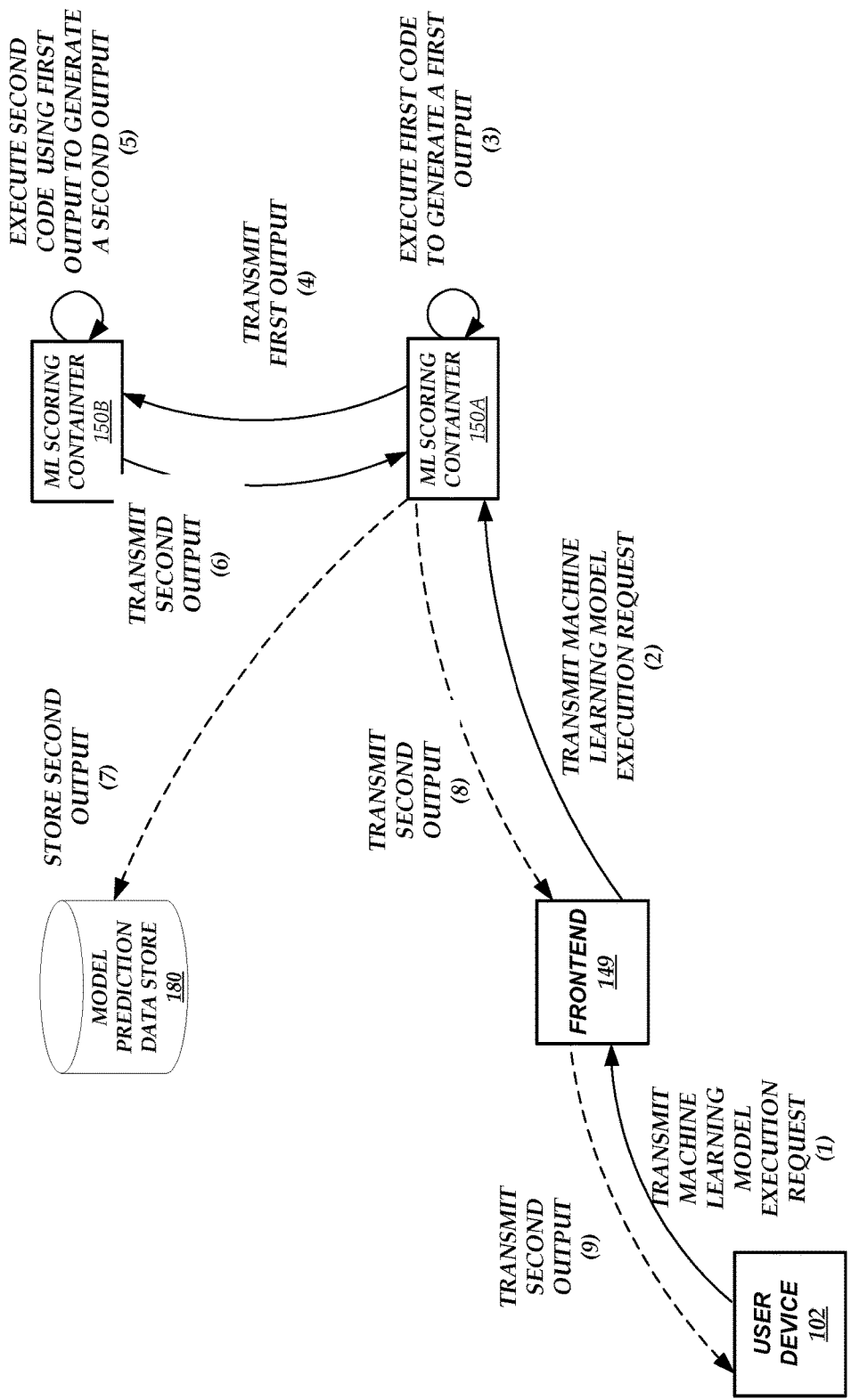
FIG. 6 is a block diagram of the operating environment of FIG. 1 illustrating the operations performed by the components of the operating environment to execute related machine learning models, according to some embodiments.

FIG. 6 is a block diagram of the operating environment 100 of FIG. 1 illustrating the operations performed by the components of the operating environment 100 to execute related machine learning models, according to some embodiments. As illustrated in FIG. 6, user device 102 transmits a machine learning model execution request to the frontend 149 at (1). The frontend 149 then forwards the execution request to a first ML scoring container 150A initialized in a virtual machine instance 142 at (2). In some embodiments, the execution request can include a request for an output from a second machine learning model executed by a second ML scoring container 150B initialized in the virtual machine instance 142. However, to generate an output, the ML scoring container 150B needs data from the execution of a first machine learning model executed by the ML scoring container 150A. Thus, the virtual machine instance 142 initially routes the execution request to the ML scoring container 150A. In some embodiments, the ML scoring container 150A servers as a master container, managing communications to and from other ML scoring containers (e.g., ML scoring container 150B).

In some embodiments, virtual machine instance 142 causes the ML scoring container 150A to execute first code to generate a first output at (3). For example, execution of the first code represents the execution of a first machine learning model using input data included in the execution request. The ML scoring container 150A then transmits the first output to the ML scoring container 150B at (4).

The virtual machine instance 142 then causes the second ML scoring container 150B to execute second code using the first output to generate a second output at (5). For example, execution of the second code represents the execution of a second machine learning model using the first output as an input to the second machine learning model. The second ML scoring container 150B then transmits the second output to the first ML scoring container 150A at (6).

In some embodiments, the virtual machine instance 142 pulls the second output from the first ML scoring container 150A and stores the second output in the model prediction data store 180 at (7). Alternatively or in addition, the virtual machine instance 142 pulls the second output from the first ML scoring container 150A and transmits the second output to the frontend 149 at (8). The frontend 149 then transmits the second output to the user device 102 at (9).

In some embodiments, not shown, the ML scoring containers 150A-150B are initialized in different virtual machine instances 142. Thus, the transmissions of the first output and the second output can occur between virtual machine instances 142.

Example Machine Learning Model Accuracy Improvement Routine

Figure 7:
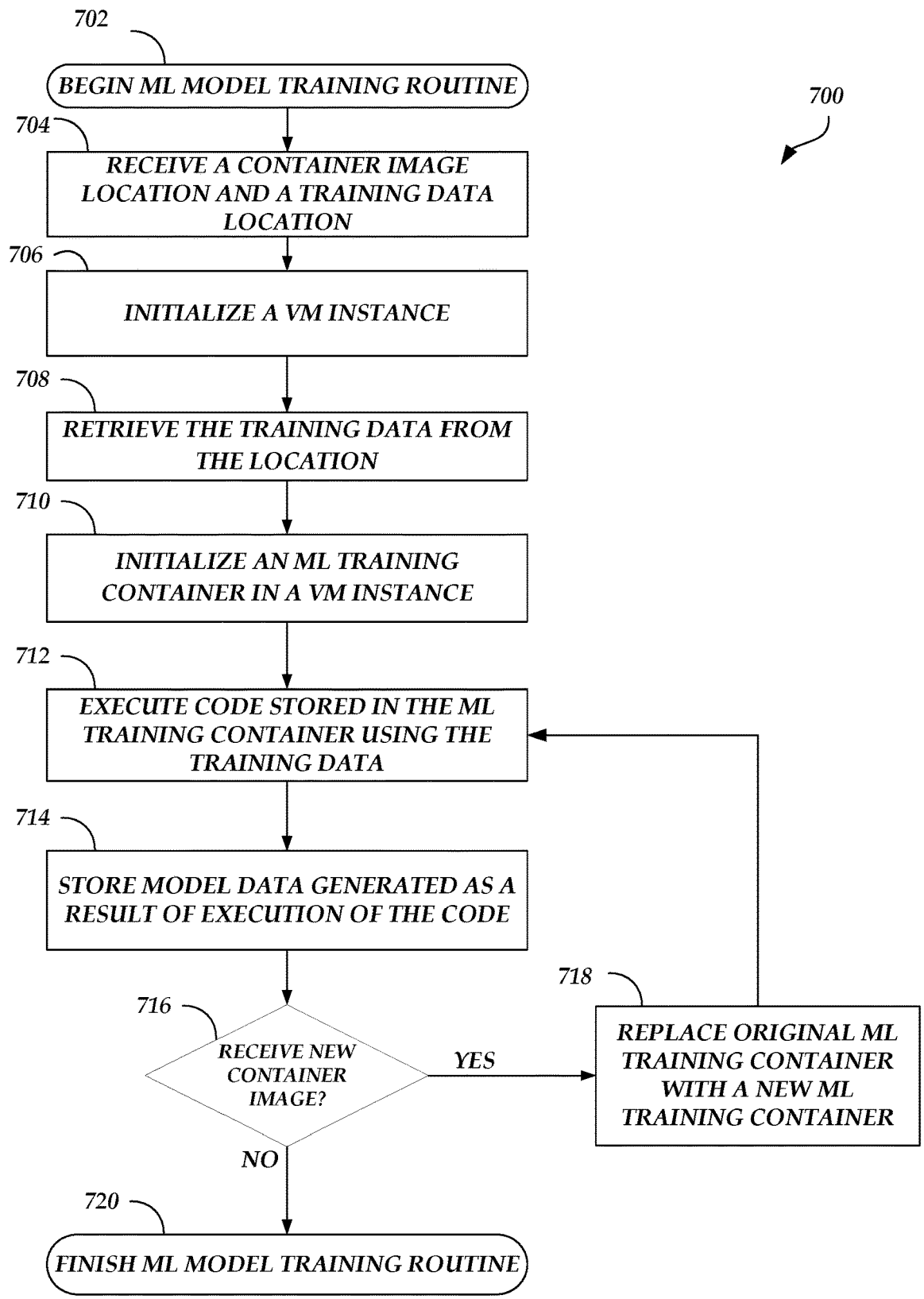
FIG. 7 is a flow diagram depicting a machine learning model training routine illustratively implemented by a model training system, according to some embodiments.

FIG. 7 is a flow diagram depicting a machine learning model training routine 700 illustratively implemented by a model training system, according to some embodiments. As an example, the model training system 120 of FIG. 1 can be configured to execute the machine learning model training routine 700. The machine learning model training routine 700 begins at block 702.

At block 704, in some embodiments, a container image location and a training data location are received. For example, the container image location and the training data location are received as part of a training request.

At block 706, in some embodiments, a virtual machine instance is initialized. For example, the initialized virtual machine instance is the instance that will perform the machine learning model training.

At block 708, in some embodiments, the container image and training data are retrieved. For example, the container image can be retrieved from the container data store 170 and the training data can be retrieved from the training data store 160.

At block 710, in some embodiments, an ML training container is initialized in the virtual machine instance. For example, the ML training container is formed using the received container image. The container image includes executable instructions that define an algorithm. Thus, the ML training container includes code that includes executable instructions that define an algorithm.

At block 712, in some embodiments, code stored in the ML training container is executed using the retrieved training data. For example, the retrieved training data (e.g., input data in the training data) is supplied as inputs to the executable instructions that define the algorithm (e.g., using as values for input parameters of the executable instructions).

At block 714, in some embodiments, model data generated as a result of execution of the code is stored. For example, the model data is stored in the training model data store 175. Model data can be periodically generated during the machine learning model training process.

At block 716, in some embodiments, a determination is made as to whether a new container image is received during the machine learning model training process. If a new container image is received, the machine learning model training routine 700 proceeds to block 718. Otherwise, if no new container image is received during the machine learning model training process, the machine learning model training routine 700 proceeds to block 720 and ends.

At block 718, in some embodiments, the original ML training container is replaced with a new ML training container. For example, the new ML training container is formed using the new container image. Once the original ML training container is replaced, the machine learning model training routine 700 proceeds back to block 712 such that code stored in the new ML training container is executed using the training data.

In some embodiments, not shown, a new container image is not received. However, a new hyperparameter (e.g., a change to the number of clusters, a change to the number of layers, etc.), new code, and/or the like is received. The model training system 120 can modify the original ML training container during runtime (instead of replacing the original ML training container with a new ML training container) to train the machine learning model using the new hyperparameter, using the new code, and/or the like.

Sequence to Sequence Modeling

S2S models refer to modeling a specific set of applications where the input is a sequence of tokens and the output is another sequence of tokens. Exemplary applications include: machine translation (input a sentence from one language and predict what the sentence would be in another language), abstractive summarization (input a longer text document and predict a summary or title from that document), etc.

Figure 8:
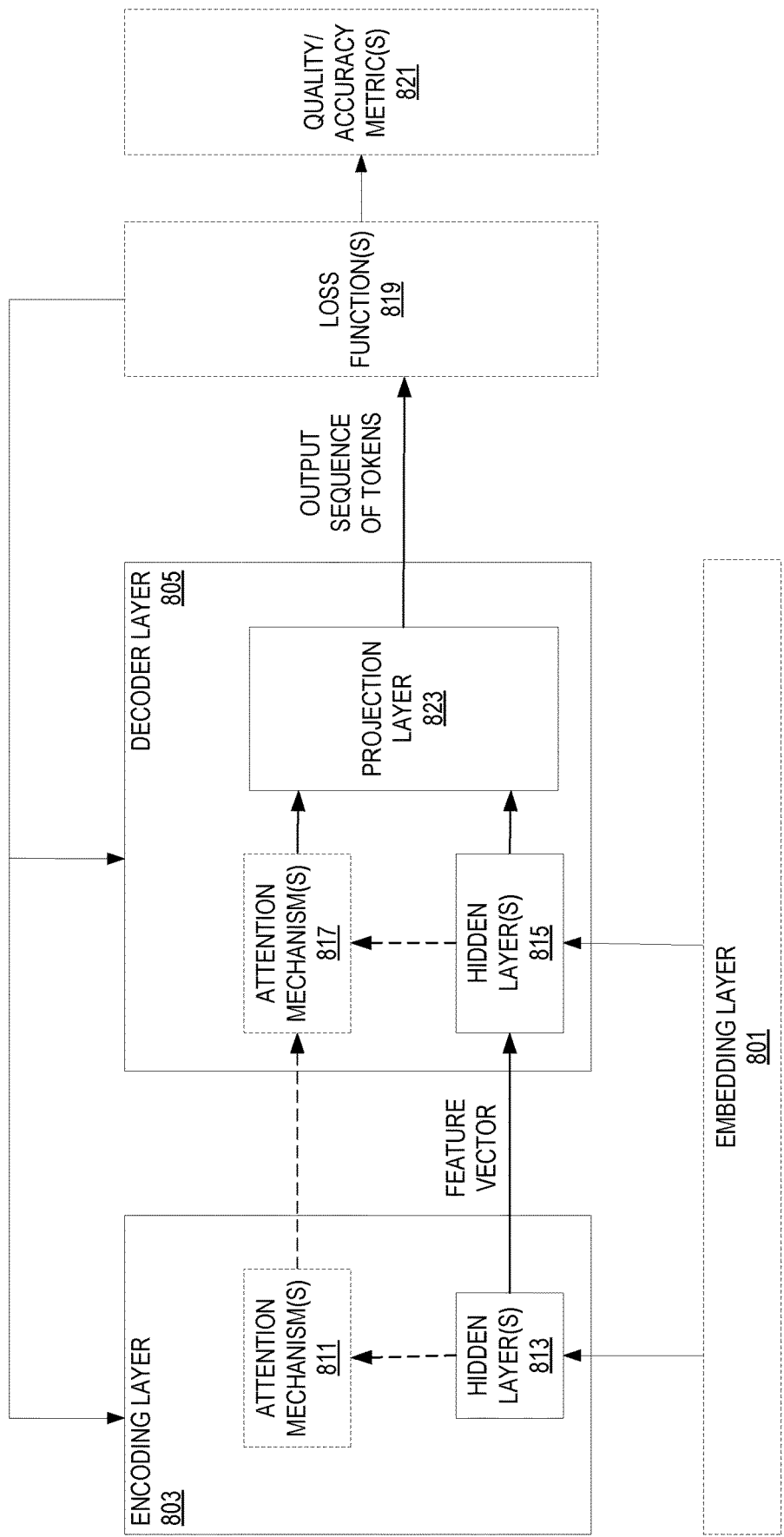
FIG. 8 is a block diagram of an illustrative sequence to sequence (S2S) model, according to some embodiments.

FIG. 8 illustrates embodiments of S2S models. In particular, what is illustrated can be considered a network for S2S modeling. Not all of the components are always used, however, there is always an encoding layer and a decoding layer.

In some embodiments, an embedding layer 801 takes in a sequence input tokens encoded in a sparse way (for example, one-hot encoded) and maps them to a dense feature layer. This may be done because a high-dimensional feature vector is generally more capable of encoding information regarding a particular token (word for text corpora) than a simple one-hot-encoded vector.

An encoding layer 803 takes in the input sequence (embedded if such a layer was used) and compresses all the information into a feature vector. Typically, an encoder is made of one or more Recurrent Neural Network (RNN) based layers which may be made of long short-term memory (LSTM) units or gated recurrent units (GRUs). However, other network based layers (such as convolutional neural networks (CNN) based) may be used. These layers are the hidden layers 813 whose output is not normally seen outside of the encoding layer 803.

A decoding layer 805 takes the feature vector output from the encoding layer 803 and produces an output sequence of tokens. Typically, a decoder made of one or more RNN based layers which may be made of LSTM units or GRUs. However, other networks (such as convolutional neural networks (CNN) based) layers may be used. These layers are the hidden layers 815 whose output is not normally seen outside of the decoding layer 805. A projection layer 823 provides the output in the form of a sequence of tokens.

A potential disadvantage of an encoder-decoder framework is that performance of the model decreases as, and when, the length of the source sequence increases because of the limit of how much information the fixed length encoded feature vector can contain. To address this, an attention mechanism layer may be used, in which the decoder layer 805 tries to find the location in the encoder sequence where the most important information could be located and uses that information, as well as previously decoded information, to predict the next token in the sequence. As such, the encoding layer 803 and decoder layer 805 include one or more attention layers 811 and 817 in these embodiments. The attention layers 811 and 817 take the current value of the hidden state in the decoder layer 805 and all the hidden states in the encoder layer 803, and calculate an augmented version of the hidden state to use. In some embodiments, the contribution from the encoder layer's 803 hidden states represents a weighted sum of all of its hidden states where the highest weight corresponds both to the biggest contribution to the augmented hidden state and to the hidden state that will be most important for the decoder layer 805 to consider.

Loss function(s) 819 calculate the loss for the model. Cross entropy and smooth cross entropy are examples of such functions. Feedback from the loss function(s) 819 may be used to adjust the encoding layer 803, decoder layer 805, etc.

Quality/accuracy metrics 821 evaluate the quality of the result of the model. Examples include, but are not limited to, perplexity (the probability of generating the test sequence normalized), BLEU (Bilingual Evaluation Understudy), or other accuracy evaluation.

Note that placement in the illustration does not mean that all embodiments work that way. For example, in some embodiments, loss functions 819 and/or quality/accuracy metrics 821 are a part of the decoder layer 805, or, in some embodiments, the attention layers 811 and 817 are outside of the encoder layer 803 and decoder layer 805.

Figure 9:
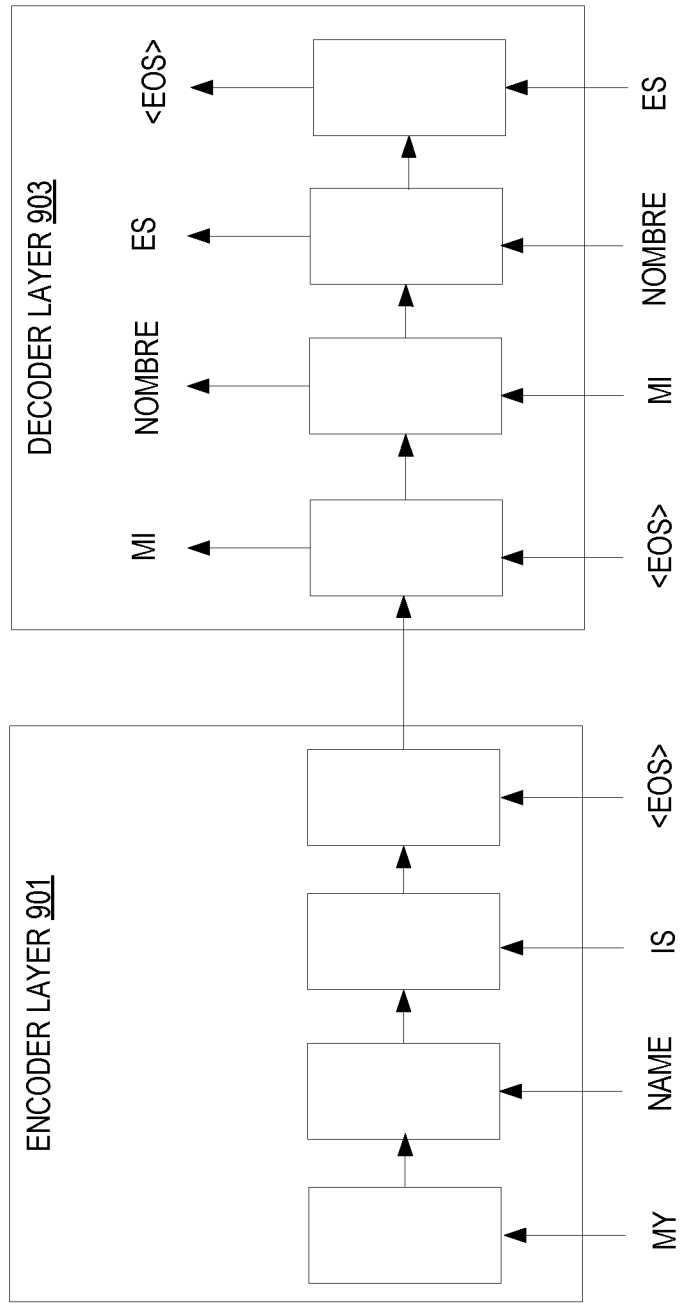
FIG. 9 illustrates an example of a portion of an S2S model in action, according to some embodiments.

FIG. 9 illustrates an example of a portion of an S2S model in action. In this simplistic example, there is an encoder layer 901 and a decoder layer 903. There is no attention mechanism or embedding layer shown. Further, in this example, each rectangle within the layers 901 and 903 is a part of a hidden layer (e.g., a part of a RNN or CNN).

As shown a sequence of tokens is provided to the encoder layer 901 in English. This sequence is "My name is <EOS>." As shown, each token (word) is fed to the encoder layer 901 in order, with state passed along during encoding. <EOS> indicates the end of the sequence. The output of the encoder layer 901 is a vector of the state of the encoder.

The decoder layer 903 takes the output vector from the encoder layer 901 as its initial state. The <EOS> input indicates the decoder layer 903 is to start the decoding. The decoder layer 903 is trained to output "Mi nombre es<EOS>" in response to this initial state. Note that each previous output is fed into the next rectangle.

In some embodiments, the systems detailed above for machine learning model training and hosting allow for S2S model (such as those detailed above) generation and usage. In some embodiments, S2S support allows for encoder-decoder architectures to build and train neural network models for translation, summarization, language modeling etc.

Figure 10:
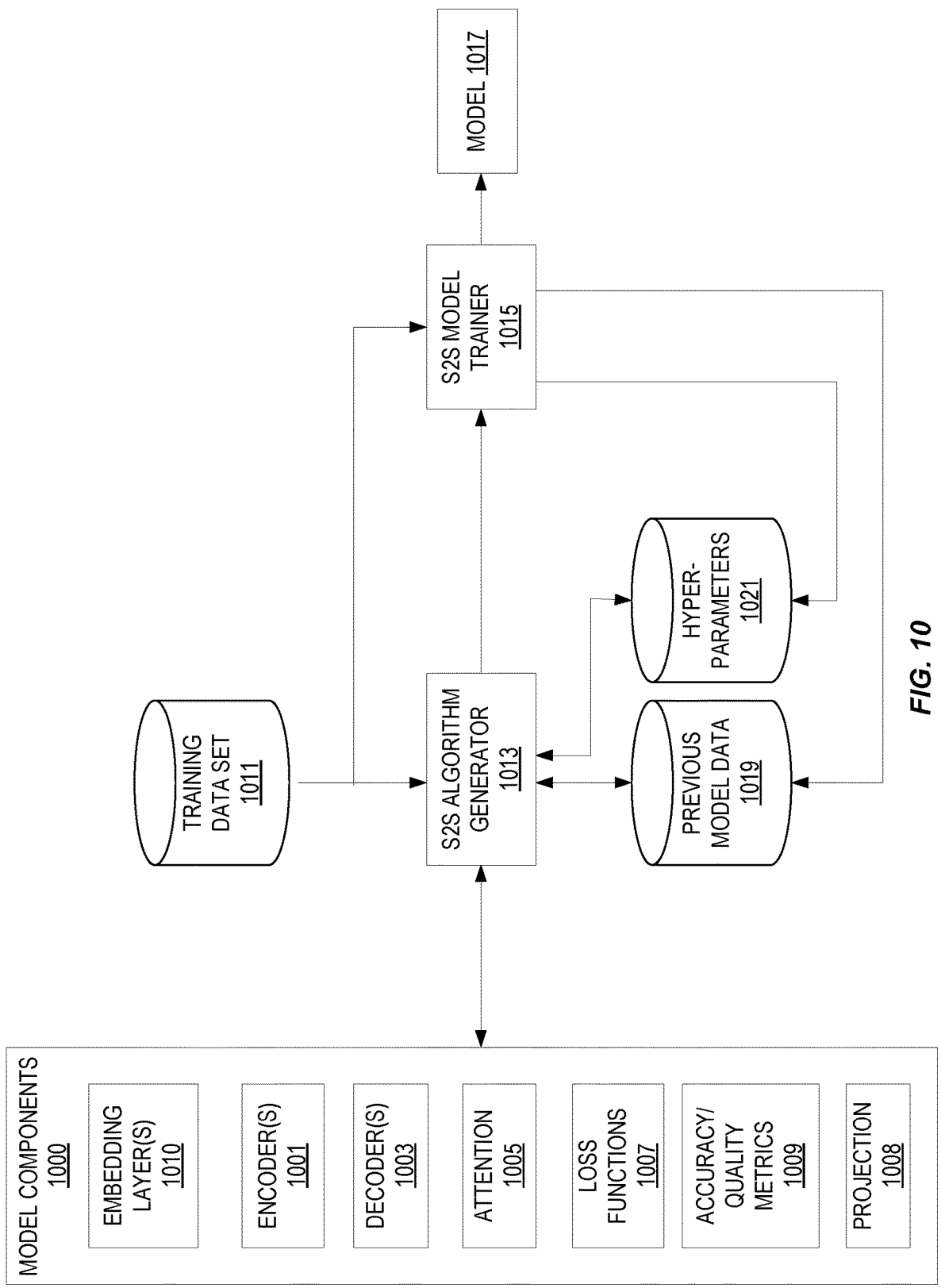
FIG. 10 is a block diagram of an illustrative system for S2S modeling, according to some embodiments.

FIG. 10 illustrates an embodiment of a system for S2S modeling. Typically, this system is a software offering stored in memory and executed by a web service. This is a fully managed end-to-end system for training generic sequence to sequence models with configurable network primitives, hyper-parameter optimization and ability to search through various combinations of network primitives to build a network architecture. In some embodiments, the system of FIG. 10 is a part of model training system 120 and/or model hosting system 140. The S2S algorithm generator 1013 and/or S2S model trainer 1015 are activated in response to a request to generate a S2S model and/or train a S2S model for a given use case.

As detailed, S2S modeling consists of network primitives (layers) in the form of encoders (CNN/RNN), decoders (CNN/RNN), attention mechanisms (dot product/scaled), loss functions (Cross Entropy/Smooth Cross Entropy), and/or accuracy metrics (Perplexity/Accuracy/Bleu), any of which can be combined in various permutations and combinations to build and train a network end-to-end. The various model components (network primitives) 1000 detailed above (encoder(s) 1001, decoder(s) 1003, attention layer(s) 1005, loss functions 1007, embedding layer(s) 1010, accuracy/quality metrics 1009, and/or projection layer 1008) are stored, or accessible to, S2S algorithm generator 1013.

Previous model data 1019 stores, per use case, indications of what network primitives have worked best in previously generated S2S models. For example, what type of encoder 1001 (RNN or CNN) has been used in combination with a certain type of decoder 1003 to achieve a particular accuracy for a given use case (such as translation, summarization, language modeling, etc.). The previous model data 1019 also stores parameters of the use case such as the task to be performed, data characteristics of the training data (task), input/output format, etc. In some embodiments, an input/output format indicates that the same S2S algorithm can be extended to different use-cases in the domain of Text/Audio/Image/Video, rather than being confined to one domain and having the need to build separate algorithm or interface to cater to various types of input/output data. In some embodiments, the previous model data 1019 and hyperparameters 1021 are stored as a part of training model data store 175 and/or training metrics data store 165. Exemplary hyperparameters 1021 are stored per use case in some embodiments. In some embodiments, the previous model data is formatted as one or more tables with fields for use case type (general task), specific details about the use case (such as romantic language usage), network primitives, data characteristics, input/output format, etc. In some embodiments, hyperparameters 1021 are similarly organized by table with use cases providing an index to hyperparameters for that use case. Hyperparameters 1021 and previous model data 1019 are stored in containers in some embodiments. In some embodiments, they are stored as database tables in other embodiments.

The S2S algorithm generator 1013 takes in available model components 1000, a training data set 1011 (usually supplied with a request to generate and/or train a S2S model, or made available in response to the request), previous model data 1019, and/or hyperparameters 1021 that have been judged to be optimal for the use case of the request, and outputs a S2S algorithm to train into a S2S model. In some embodiments, the output of a the S2S algorithm generator 1013 is a container as detailed above having an OS, runtime, and the S2S algorithm code. The training data 1011 is stored in training data store 160 in some embodiments.

In some embodiments, the S2S algorithm generator 1013 evaluates the training data set 1011 to determine what use case is most applicable to the data. Using the previous model data 1019, parameters for this use case are found in some embodiments. For example, the data characteristics of the training data indicates what the use case is and stored parameters for that use case are to be used in the S2S algorithm that is generated.

In some embodiments, a request to generate a S2S algorithm and model includes an indication of the use case, and the evaluation of the training data set 1011 further narrows the use case that is most applicable. For example, a request for language translation in combination with a training data set of English to Spanish indicates that the use case is language translation. As such, the most applicable use case is likely a S2S model that performed translation of English to another romantic language as opposed to a translation of English to Hindi. Other parameters may then be extracted from previous model data 1019.

In some embodiments, the S2S algorithm generator 1013 also uses hyperparameter optimization (HPO) not only for searches for common parameters related to training (e.g., batch-size, number-of-layers, learning-rate, etc.), but also searches through various combinations of these network primitives 1000 to find an optimal network architecture. As such, HPO is applied to the layers 1001-1010, previous mod& data 1019, and/or hyperparameters 1021 to determine a more optimal model. Exemplary hyperparameters to be applied are found in FIGS. 14(*a*)-(*d*).

A S2S model trainer 1015 is used to train the algorithm output by the S2S algorithm generator 1013 using training data (such as training data set 1011) to output a model 1017. Examples of model training using containers have been detailed above. A trained model 1017 may also be hosted in model hosting system 140, as detailed above, for inference.

The S2S model trainer 1015 further stores information about the results of the training to the previous model data storage 1019 and hyperparameter storage 1021 to be used in later S2S algorithm generations, modifications, etc. The S2S model trainer 1015 may also take in new training data to re-train the model, or manual changes to parameters and hyperparameters. The S2S model trainer 1015 may run trainings run across multiple users and use cases.

In some embodiments, the S2S model trainer 1015 expects training and validation datasets in protocol buffer format adhering to the common schema. In some embodiments, individual records are packed as 32-bit integer tensors.

In some embodiments, a pre-processing script is used prior to training to convert tokenized parallel text corpora to a required format. For each of the training and validation sets, the pre-processing script expects parallel corpora from the user. In some embodiments, the parallel corpora have two text files, corresponding to the source and target. Line numbers in source and target files are generally have one to one correspondence, with a single input per line. In some embodiments, the pre-processing script will do the following tasks: generate source and target vocabulary JSONs—"vocab.src.json", "vocab.trg.json" by mapping text tokens into integers, and after vocabulary generation, map the string tokens to integers, and encode the source and target sequences to recordio-protobuf format to finally generate a "train.rec" and a "val.rec."

In some embodiments, after pre-processing is done, the S2S model trainer 1015 is invoked for training and expects data in three channels 1) train: the training data (e.g., the train.rec file generated by the pre-processing script); 2) validation: the validation data (e.g., the val.rec file generated by the pre-processing script); and 3) vocab: the two vocabulary files (e.g., vocab.src.json & vocab.trg.json).

In some embodiments, inference using the model 1017 supports two different data formats (application/json format and recordio-protobuf format). Both mode supports batching of input data. application/json format will also allow one to visualize the attention layer 1005 (if used).

In some embodiments, the following additional configuration options are supported in S2S models: 1) "configuration": {"attention matrix": "true"}—returns the attention matrix for the particular input sequence; and 2) application/x-recordio-protobuf—the input is expected in recordio-protobuf format and will return the output in recordio-protobuf format.

Figure 11:
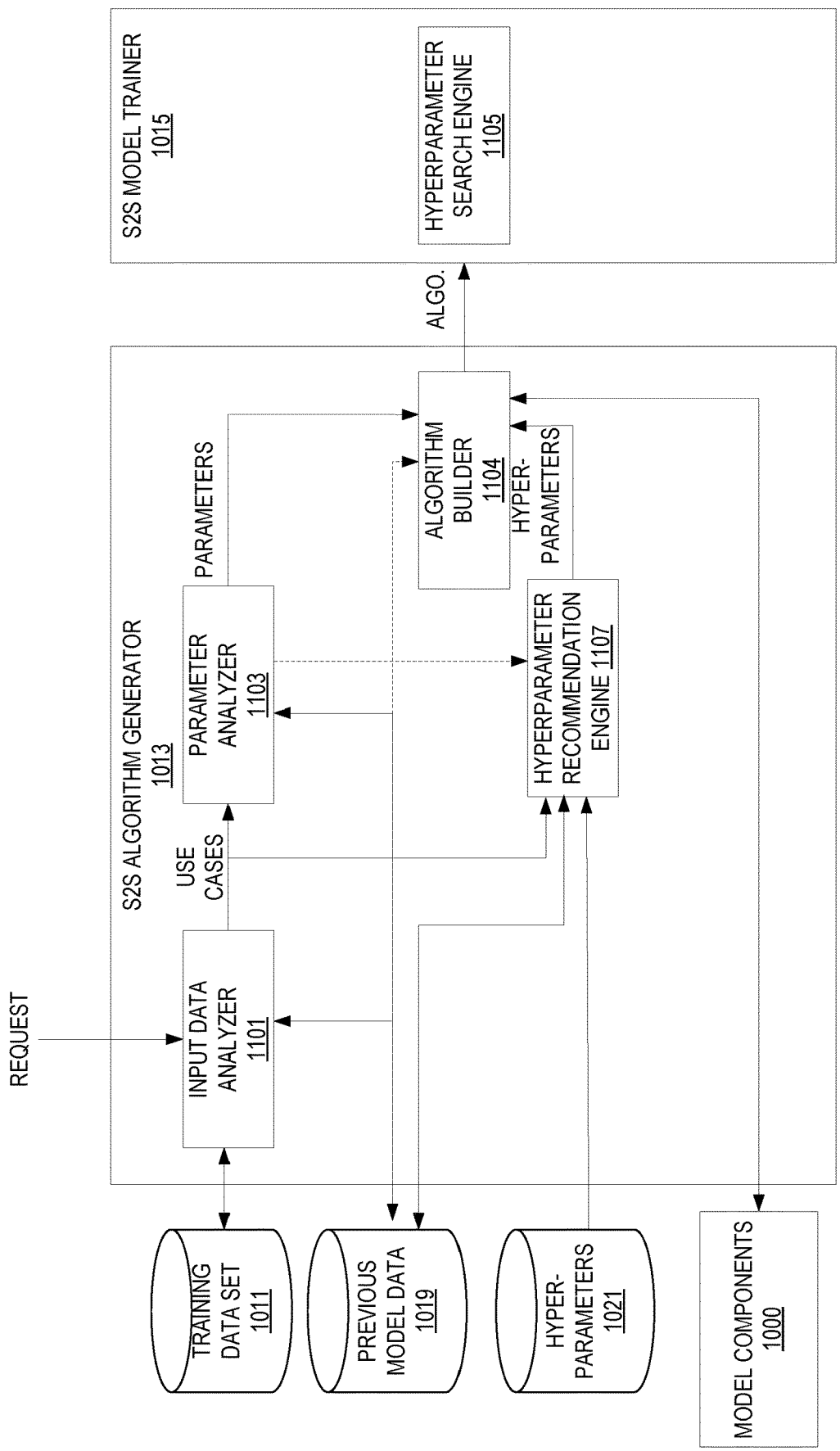
FIG. 11 is a block diagram of an example S2S algorithm generator, according to some embodiments.

FIG. 11 illustrates embodiments of a S2S algorithm generator. In particular, this figure illustrates S2S algorithm generator 1013. The S2S algorithm generator 1013 typically operates in response to a request to generate a S2S algorithm. The content of this request is subjected to an input data analyzer 1101 that determines what use case(s) is/are applicable to the training data set 1011 associated with the request. The input data analyzer 1101 uses previous model data 1019 to make this determination.

The set of use cases is provided to a parameter analyzer 1103 and a hyperparameter recommendation engine 1107. The parameter analyzer 1103 uses previous model data 1019 and use case information to determine parameters to be used for the S2S algorithm/model. For example, for a particular use case, what the data characteristics should be, what network primitives to use, etc. Note, in some embodiments the hyperparameter recommendation engine 1107 is an external service called by the S2S algorithm generator.

The hyperparameter recommendation engine 1107 uses hyperparameter data 1021 and use case information to determine hyperparameters to be used for the S2S algorithm/model. In some embodiments, hyperparameter recommendation engine 1107 performs a grid, random, or other search is made of previous hyperparameters 1021 that apply to the use cases.

In some embodiments, the hyperparameter recommendation engine 1107 implements a lookup-based technique of hyperparameters 1021 associated with uses cases. In particular, the use cases are used to lookup or infer hyperparameter values. The resulting values (and/or the initial set of values to be searched through) are ordered or filtered according to a desired performance or accuracy metric in some embodiments.

In some embodiments, a hyperparameter search engine 1105, of the S2S model trainer 1015, is used to adjust a (trained) model's hyperparameters. The model can thus be used with features provided by the user or inferred as inputs to output desired values—e.g., hyperparameter values. For example, when the data in the entries is relatively high-dimensional (e.g., twenty features, forty features, etc.), an exact match might not be able to be found using a lookup technique, so a model can be trained—e.g., train a KNN model to find the k nearest entries. As such, the determined S2S use case(s), the format of the training data, a number of elements, a size of the training data (e.g., one megabyte (MB) each and/or ten gigabytes (GB) in total), etc. could be used by such a model as inputs to identify one or multiple "closest" hyperparameter use cases and provide the desired data (e.g., hyperparameters).

An algorithm builder 1104 takes the determined parameters and hyperparameters and generates a S2S algorithm (or reports out constituent parts of an algorithm). For example, using the parameters (if they include what network primitives to use), the algorithm builder 1104 builds an algorithm comprising at least an encoder and decoder. The hyperparameters may further define the use of the encoder, decoder, etc. When the parameters do not include the network primitives, the algorithm builder 1104 pulls these from previous model data 1019 and generates a S2S algorithm (or reports out constituent parts of an algorithm).

Figure 12:
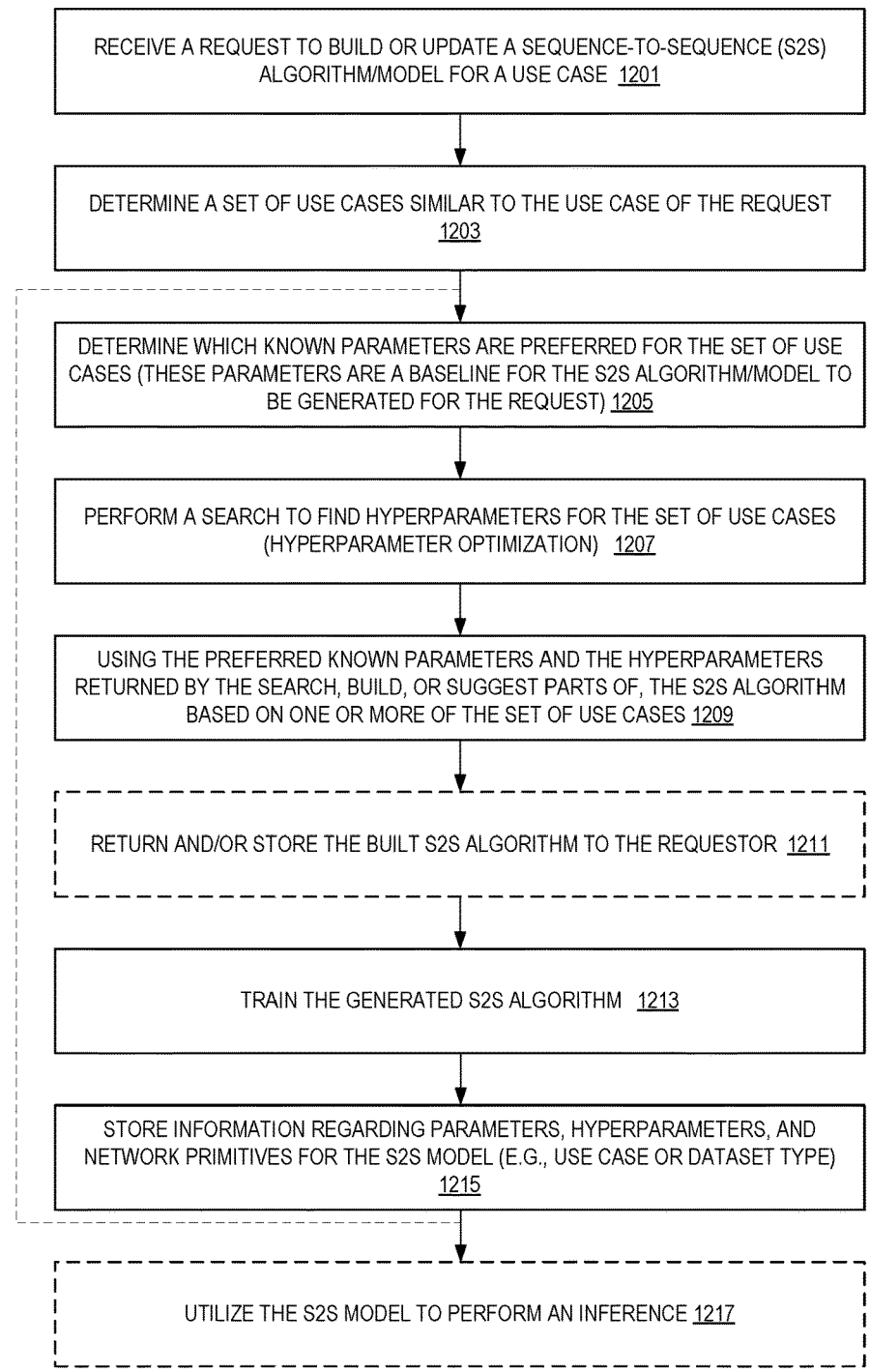
FIG. 12 is a flow diagram illustrating an example method to generate and/or train a S2S model, according to some embodiments.

FIG. 12 illustrates embodiments of a method. In some embodiments, this method is to generate and/or train a S2S model. In some embodiments, these actions are performed by one or more of the S2S algorithm generator 1013 and S2S model trainer 1015. In some embodiments, the method further includes performing an inference.

At 1201, a request to build or update a S2S model for a use case is received. As detailed, the minimal request typically includes a training data set or a reference to a training data set. In some embodiments, the request includes an indication of a particular use case for the S2S model.

A set of use cases similar to the use case of the request is determined at 1203. In particular, a query is made for previous S2S algorithms and models that match up with the use case based on previous S2S model data. For example, when the request only includes the training data set, a set of use cases is inferred from the data types of the training data set. When the request includes an indication of a particular use case, the training data set may be used to further narrow the set of use cases. Examples of use cases include, but are not limited to: machine translation (inputting a sentence from one language and predicting what that sentence would be in another language), text summarization (inputting a longer string of words and predicting a shorter string of words that is a summary), and speech to text.

A determination of which known parameters are preferred for the set of use cases is made at 1205. For example, what encoder and decoder combination to use, the input/output format, other network primitives, etc. are determined. For example, in some embodiments, previous model data fields are searched for use case type (general task), specific details about the use case (such as romantic language usage), network primitives, data characteristics, input/output format, etc. These known parameters are a baseline for the S2S algorithm/model to be generated.

At 1207, a search of hyperparameters for the set of use cases is made to provide a set of hyperparameters to use for the S2S algorithm/model. This is hyperparameter optimization. For example, a grid, random, or other search is made of previous hyperparameters 1021 that apply to the use cases in some embodiments. These hyperparameters found using a hyperparameter search engine 1105 in some embodiments. Note the number of layers and/or hidden units are some of the commonly suggested hyperparameters for a given case type. Loss types, training metrics, and optimized metrics are also hyperparameters that may be provided.

Using the preferred known parameters and found hyperparameters, at least one S2S algorithm is built or suggested at 1209. For example, in some embodiments, at least one S2S algorithm is built using the best use case(s), wherein the parameters and hyperparameters that have been determined are used. In some embodiments, parts to use for least one S2S algorithm using the best use case(s) are provided to a user, wherein the parameters and hyperparameters that have been determined are to be used.

At 1211, the built S2S algorithm(s) is/are returned to the requestor and/or stored for use in some embodiments. For example, an algorithm location is provided, or the built algorithm itself is return.

In some embodiments, the built S2S algorithm(s) are trained to build one or more S2S models at 1213. For example, the entirety of each algorithm built is trained. Typically, this training uses the provided training data set. In some embodiments, the S2S model trainer 1015 is invoked for training and expects data in three channels: 1) train: the training data (e.g. the train.rec file generated by the pre-processing script); 2) validation: the validation data (e.g. the val.rec file generated by the pre-processing script); and 3) vocab: the two vocabulary files (vocab.src.json & vocab.trg.json). In some embodiments, when multiple S2S algorithms are to be trained, an optimal algorithm/model is picked at 1213. Training may be performed such as that detailed with respect to FIGS. 2-7 above. For example, in some embodiments, the action of 1213 comprises the actions described with respect to FIG. 7. In some embodiments, pre-processing is done before training (as detailed above).

In some embodiments, the information regarding parameters, hyperparameters, and network architectures of the optimal S2S algorithm/model are stored at 1215. This information may be stored per use case or dataset type in tables as detailed above.

The trained model is hosted in model hosting system 140 as detailed above for inference at 1217 in some embodiments.

FIG. 13 illustrates embodiments of a S2S job to be run using the above systems. The "AlgorithmSpecification" includes what "TrainingImage" container 1301. It is the container that is suggested or made by the S2S model trainer 1015.

The hyperparameters 1303 includes those hyperparameters that were suggested by the hyperparameter search engine 1105. Of course, other hyperparameters may be used.

Note the number of layers and/or hidden units are some of the commonly suggested hyperparameters for a given case type. Loss types, training metrics, and optimized metrics are also hyperparameters that may be provided.

The above sequence to sequence modeling may also serve as a simple and easy-to-use benchmarking tool for researchers who want to compare their models against state of the art published results. Instead of implementing the baseline from scratch, these users can use this system to compare and report their results, thereby reducing significant effort on their side as well as making it easy to reproduce and validate their results for other researchers.

Figure 15:
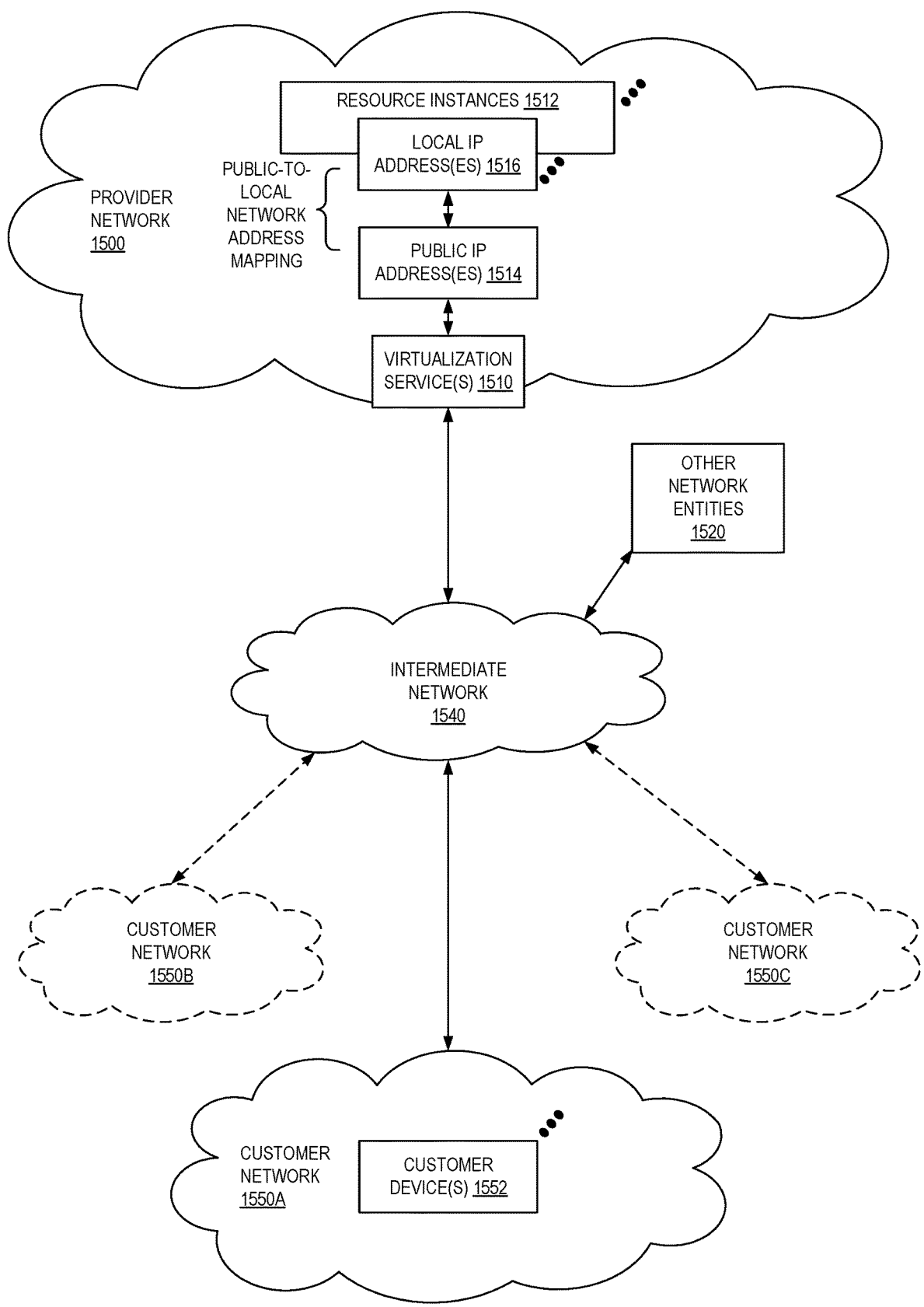
FIG. 15 illustrates an example provider network environment according to some embodiments.

FIG. 15 illustrates an example provider network (or "service provider system") environment according to some embodiments. A provider network 1500 may provide resource virtualization to customers via one or more virtualization services 1510 that allow customers to purchase, rent, or otherwise obtain instances 1512 of virtualized resources, including but not limited to computation and storage resources, implemented on devices within the provider network or networks in one or more data centers. Local IP addresses 1516 may be associated with the resource instances 1512; the local IP addresses are the internal network addresses of the resource instances 1512 on the provider network 1500. In some embodiments, the provider network 1500 may also provide public IP addresses 1514 and/or public IP address ranges (e.g., Internet Protocol version 4 (IPv4) or Internet Protocol version 6 (IPv6) addresses) that customers may obtain from the provider 1500.

Conventionally, the provider network 1500, via the virtualization services 1510, may allow a customer of the service provider (e.g., a customer that operates one or more client networks 1550A-1550C including one or more customer device(s) 1552) to dynamically associate at least some public IP addresses 1514 assigned or allocated to the customer with particular resource instances 1512 assigned to the customer. The provider network 1500 may also allow the customer to remap a public IP address 1514, previously mapped to one virtualized computing resource instance 1512 allocated to the customer, to another virtualized computing resource instance 1512 that is also allocated to the customer. Using the virtualized computing resource instances 1512 and public IP addresses 1514 provided by the service provider, a customer of the service provider such as the operator of customer network(s) 1550A-1550C may, for example, implement customer-specific applications and present the customer's applications on an intermediate network 1540, such as the Internet. Other network entities 1520 on the intermediate network 1540 may then generate traffic to a destination public IP address 1514 published by the customer network(s) 1550A-1550C; the traffic is routed to the service provider data center, and at the data center is routed, via a network substrate, to the local IP address 1516 of the virtualized computing resource instance 1512 currently mapped to the destination public IP address 1514. Similarly, response traffic from the virtualized computing resource instance 1512 may be routed via the network substrate back onto the intermediate network 1540 to the source entity 1520.

Local IP addresses, as used herein, refer to the internal or "private" network addresses, for example, of resource instances in a provider network. Local IP addresses can be within address blocks reserved by Internet Engineering Task Force (IETF) Request for Comments (RFC) 1918 and/or of an address format specified by IETF RFC 4193, and may be mutable within the provider network. Network traffic originating outside the provider network is not directly routed to local IP addresses; instead, the traffic uses public IP addresses that are mapped to the local IP addresses of the resource instances. The provider network may include networking devices or appliances that provide network address translation (NAT) or similar functionality to perform the mapping from public IP addresses to local IP addresses and vice versa.

Public IP addresses are Internet mutable network addresses that are assigned to resource instances, either by the service provider or by the customer. Traffic routed to a public IP address is translated, for example via 1:1 NAT, and forwarded to the respective local IP address of a resource instance.

Some public IP addresses may be assigned by the provider network infrastructure to particular resource instances; these public IP addresses may be referred to as standard public IP addresses, or simply standard IP addresses. In some embodiments, the mapping of a standard IP address to a local IP address of a resource instance is the default launch configuration for all resource instance types.

At least some public IP addresses may be allocated to or obtained by customers of the provider network 1500; a customer may then assign their allocated public IP addresses to particular resource instances allocated to the customer. These public IP addresses may be referred to as customer public IP addresses, or simply customer IP addresses. Instead of being assigned by the provider network 1500 to resource instances as in the case of standard IP addresses, customer IP addresses may be assigned to resource instances by the customers, for example via an API provided by the service provider. Unlike standard IP addresses, customer IP addresses are allocated to customer accounts and can be remapped to other resource instances by the respective customers as necessary or desired. A customer IP address is associated with a customer's account, not a particular resource instance, and the customer controls that IP address until the customer chooses to release it. Unlike conventional static IP addresses, customer IP addresses allow the customer to mask resource instance or availability zone failures by remapping the customer's public IP addresses to any resource instance associated with the customer's account. The customer IP addresses, for example, enable a customer to engineer around problems with the customer's resource instances or software by remapping customer IP addresses to replacement resource instances.

Figure 16:
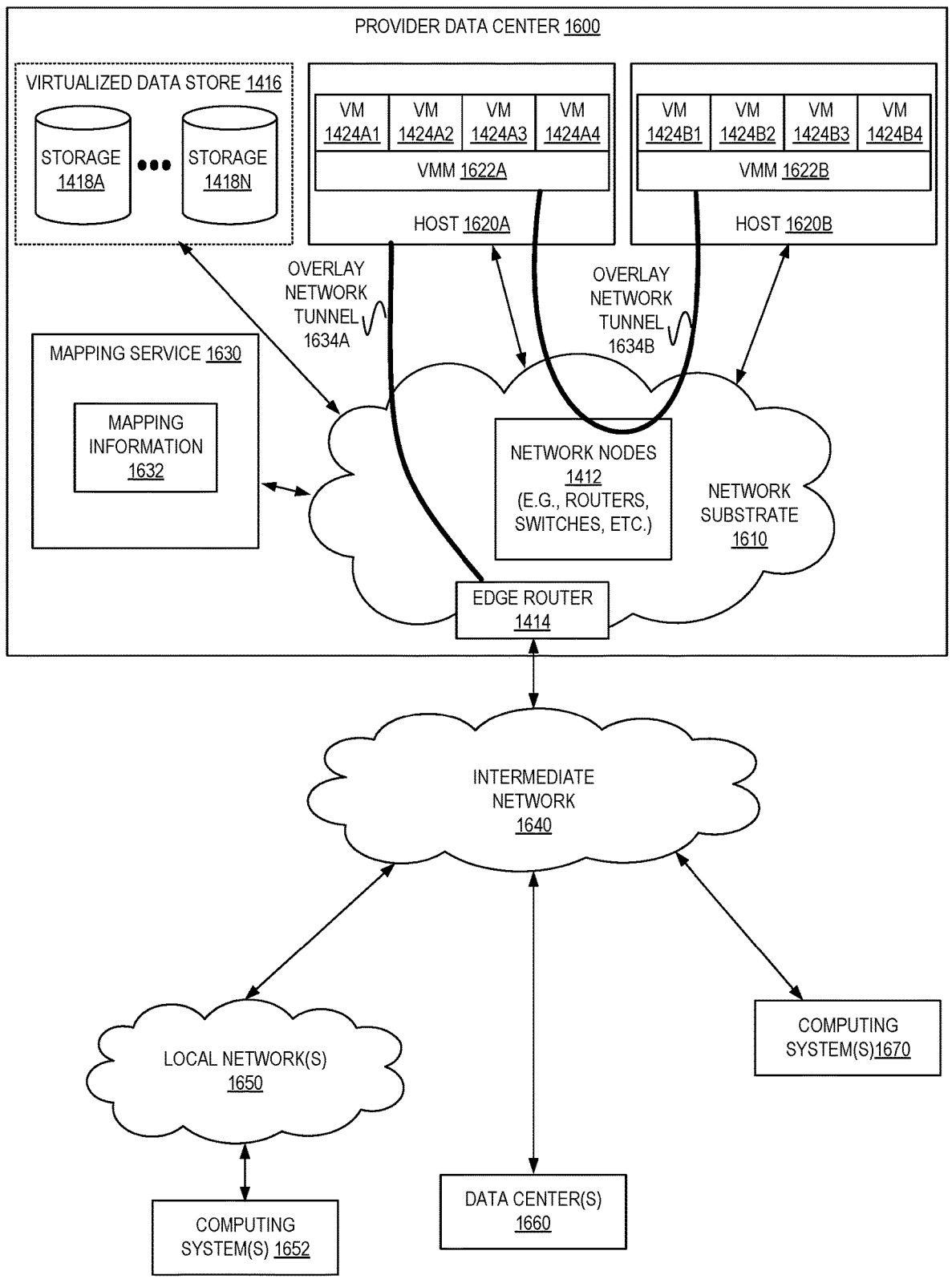
FIG. 16 illustrates an example data center that implements an overlay network on a network substrate using IP tunneling technology according to some embodiments.

FIG. 16 illustrates an example data center that implements an overlay network on a network substrate using IP tunneling technology, according to some embodiments. A provider data center 1600 may include a network substrate that includes networking nodes 1612 such as routers, switches, network address translators (NATs), and so on, which may be implemented as software, hardware, or as a combination thereof. Some embodiments may employ an Internet Protocol (IP) tunneling technology to provide an overlay network via which encapsulated packets may be passed through network substrate 1610 using tunnels. The IP tunneling technology may provide a mapping and encapsulating system for creating an overlay network on a network (e.g., a local network in data center 1600 of FIG. 16) and may provide a separate namespace for the overlay layer (the public IP addresses) and the network substrate 1610 layer (the local IP addresses). Packets in the overlay layer may be checked against a mapping directory (e.g., provided by mapping service 1630) to determine what their tunnel substrate target (local IP address) should be. The IP tunneling technology provides a virtual network topology (the overlay network); the interfaces (e.g., service APIs) that are presented to customers are attached to the overlay network so that when a customer provides an IP address to which the customer wants to send packets, the IP address is run in virtual space by communicating with a mapping service (e.g., mapping service 1630) that knows where the IP overlay addresses are.

In some embodiments, the IP tunneling technology may map IP overlay addresses (public IP addresses) to substrate IP addresses (local IP addresses), encapsulate the packets in a tunnel between the two namespaces, and deliver the packet to the correct endpoint via the tunnel, where the encapsulation is stripped from the packet. In FIG. 16, an example overlay network tunnel 1634A from a virtual machine (VM) 1624A (of VMs 1624A1-1624A4, via VMM 1622A) on host 1620A to a device on the intermediate network 1650 and an example overlay network tunnel 1634B between a VM 1624A (of VMs 1624A1-1624A4, via VMM 1622A) on host 1620A and a VM 1624B (of VMs 1624B1-1624B4, via VMM 1622B) on host 1620B are shown. In some embodiments, a packet may be encapsulated in an overlay network packet format before sending, and the overlay network packet may be stripped after receiving. In other embodiments, instead of encapsulating packets in overlay network packets, an overlay network address (public IP address) may be embedded in a substrate address (local IP address) of a packet before sending, and stripped from the packet address upon receiving. As an example, the overlay network may be implemented using 32-bit IPv4 (Internet Protocol version 4) addresses as the public IP addresses, and the IPv4 addresses may be embedded as part of 128-bit IPv6 (Internet Protocol version 6) addresses used on the substrate network as the local IP addresses.

Referring to FIG. 16, at least some networks in which embodiments may be implemented may include hardware virtualization technology that enables multiple operating systems to run concurrently on a host computer (e.g., hosts 1620A and 1620B of FIG. 16), i.e. as virtual machines (VMs) 1624 on the hosts 1620. The VMs 1624 may, for example, be executed in slots on the hosts 1620 that are rented or leased to customers of a network provider. A hypervisor, or virtual machine monitor (VMM) 1622, on a host 1620 presents the VMs 1624 on the host with a virtual platform and monitors the execution of the VMs 1624. Each VM 1624 may be provided with one or more local IP addresses; the VMM 1622 on a host 1620 may be aware of the local IP addresses of the VMs 1624 on the host. A mapping service 1630 may be aware of (e.g., via stored mapping information 1632) network IP prefixes and IP addresses of routers or other devices serving IP addresses on the local network. This includes the IP addresses of the VMMs 1622 serving multiple VMs 1624. The mapping service 1630 may be centralized, for example on a server system, or alternatively may be distributed among two or more server systems or other devices on the network. A network may, for example, use the mapping service technology and IP tunneling technology to, for example, route data packets between VMs 1624 on different hosts 1620 within the data center 1600 network; note that an interior gateway protocol (IGP) may be used to exchange routing information within such a local network.

In addition, a network such as the provider data center 1600 network (which is sometimes referred to as an autonomous system (AS)) may use the mapping service technology, IP tunneling technology, and routing service technology to route packets from the VMs 1624 to Internet destinations, and from Internet sources to the VMs 1624. Note that an external gateway protocol (EGP) or border gateway protocol (BGP) is typically used for Internet routing between sources and destinations on the Internet. FIG. 16 shows an example provider data center 1600 implementing a network that provides resource virtualization technology and that provides full Internet access via edge router(s) 1614 that connect to Internet transit providers, according to some embodiments. The provider data center 1600 may, for example, provide customers the ability to implement virtual computing systems (VMs 1624) via a hardware virtualization service and the ability to implement virtualized data stores 1616 on storage resources 1618A-1618N via a storage virtualization service.

The data center 1600 network may implement IP tunneling technology, mapping service technology, and a routing service technology to route traffic to and from virtualized resources, for example to route packets from the VMs 1624 on hosts 1620 in data center 1600 to Internet destinations, and from Internet sources to the VMs 1624. Internet sources and destinations may, for example, include computing systems 1670 connected to the intermediate network 1640 and computing systems 1652 connected to local networks 1650 that connect to the intermediate network 1640 (e.g., via edge router(s) 1614 that connect the network 1650 to Internet transit providers). The provider data center 1600 network may also route packets between resources in data center 1600, for example from a VM 1624 on a host 1620 in data center 1600 to other VMs 1624 on the same host or on other hosts 1620 in data center 1600.

A service provider that provides data center 1600 may also provide additional data center(s) 1660 that include hardware virtualization technology similar to data center 1600 and that may also be connected to intermediate network 1640. Packets may be forwarded from data center 1600 to other data centers 1660, for example from a VM 1624 on a host 1620 in data center 1600 to another VM on another host in another, similar data center 1660, and vice versa.

While the above describes hardware virtualization technology that enables multiple operating systems to run concurrently on host computers as virtual machines (VMs) on the hosts, where the VMs may be instantiated on slots on hosts that are rented or leased to customers of the network provider, the hardware virtualization technology may also be used to provide other computing resources, for example storage resources 1618A-1618N, as virtualized resources to customers of a network provider in a similar manner.

Figure 17:
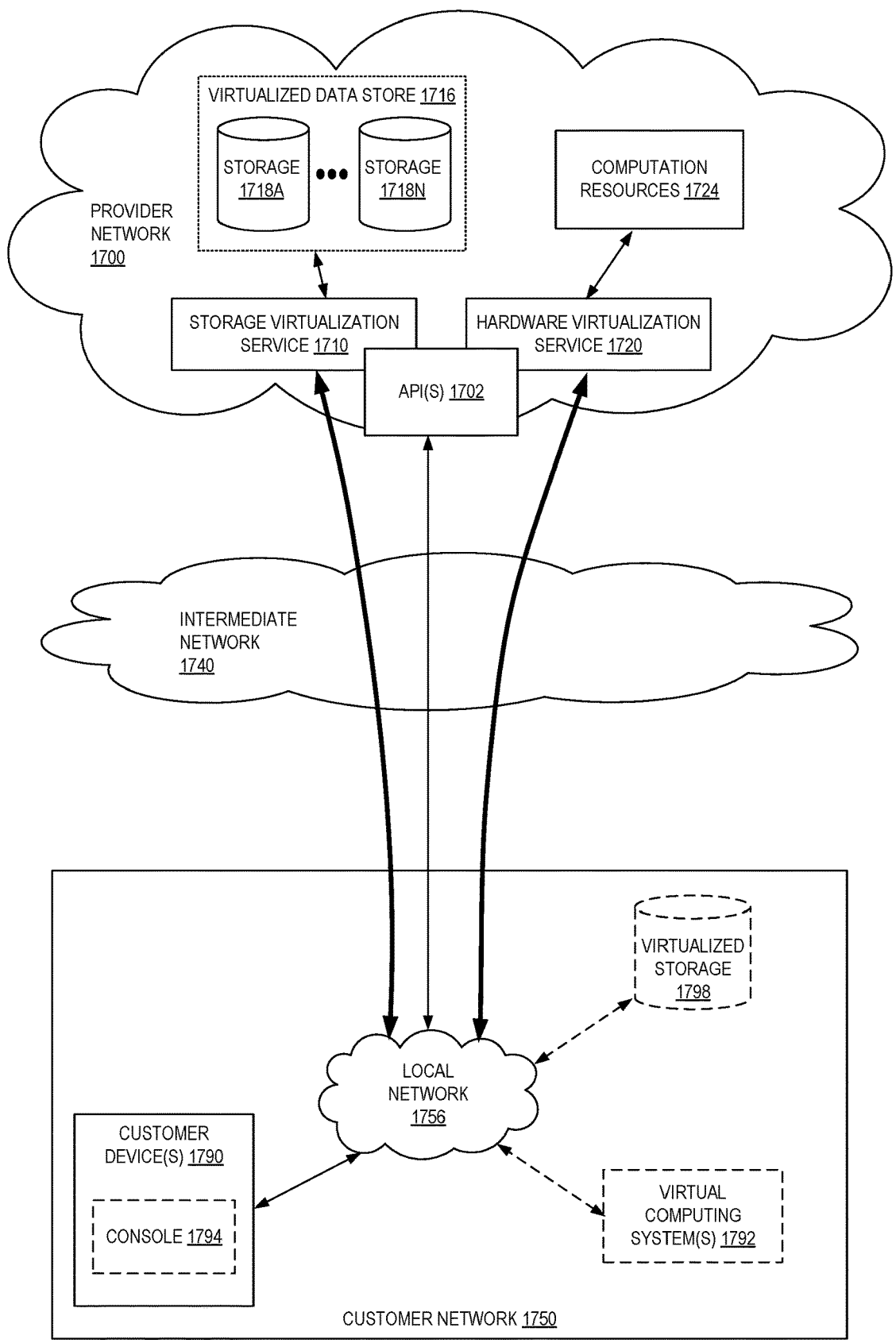
FIG. 17 is a block diagram of an example provider network that provides a storage virtualization service and a hardware virtualization service to customers according to some embodiments.

FIG. 17 is a block diagram of an example provider network that provides a storage virtualization service and a hardware virtualization service to customers, according to some embodiments. Hardware virtualization service 1720 provides multiple computation resources 1724 (e.g., VMs) to customers. The computation resources 1724 may, for example, be rented or leased to customers of the provider network 1700 (e.g., to a customer that implements customer network 1750). Each computation resource 1724 may be provided with one or more local IP addresses. Provider network 1700 may be configured to route packets from the local IP addresses of the computation resources 1724 to public Internet destinations, and from public Internet sources to the local IP addresses of computation resources 1724.

Provider network 1700 may provide a customer network 1750, for example coupled to intermediate network 1740 via local network 1756, the ability to implement virtual computing systems 1792 via hardware virtualization service 1720 coupled to intermediate network 1740 and to provider network 1700. In some embodiments, hardware virtualization service 1720 may provide one or more APIs 1702, for example a web services interface, via which a customer network 1750 may access functionality provided by the hardware virtualization service 1720, for example via a console 1794 (e.g., a web-based application, standalone application, mobile application, etc.). In some embodiments, at the provider network 1700, each virtual computing system 1792 at customer network 1750 may correspond to a computation resource 1724 that is leased, rented, or otherwise provided to customer network 1750.

From an instance of a virtual computing system 1792 and/or another customer device 1790 (e.g., via console 1794), the customer may access the functionality of storage virtualization service 1710, for example via one or more APIs 1702, to access data from and store data to storage resources 1718A-1718N of a virtual data store 1716 provided by the provider network 1700. In some embodiments, a virtualized data store gateway (not shown) may be provided at the customer network 1750 that may locally cache at least some data, for example frequently accessed or critical data, and that may communicate with virtualized data store service 1710 via one or more communications channels to upload new or modified data from a local cache so that the primary store of data (virtualized data store 1716) is maintained. In some embodiments, a user, via a virtual computing system 1792 and/or on another customer device 1790, may mount and access virtual data store 1716 volumes, which appear to the user as local virtualized storage 1798.

While not shown in FIG. 17, the virtualization service(s) may also be accessed from resource instances within the provider network 1700 via API(s) 1702. For example, a customer, appliance service provider, or other entity may access a virtualization service from within a respective virtual network on the provider network 1700 via an API 1702 to request allocation of one or more resource instances within the virtual network or within another virtual network.

Illustrative System

Figure 18:
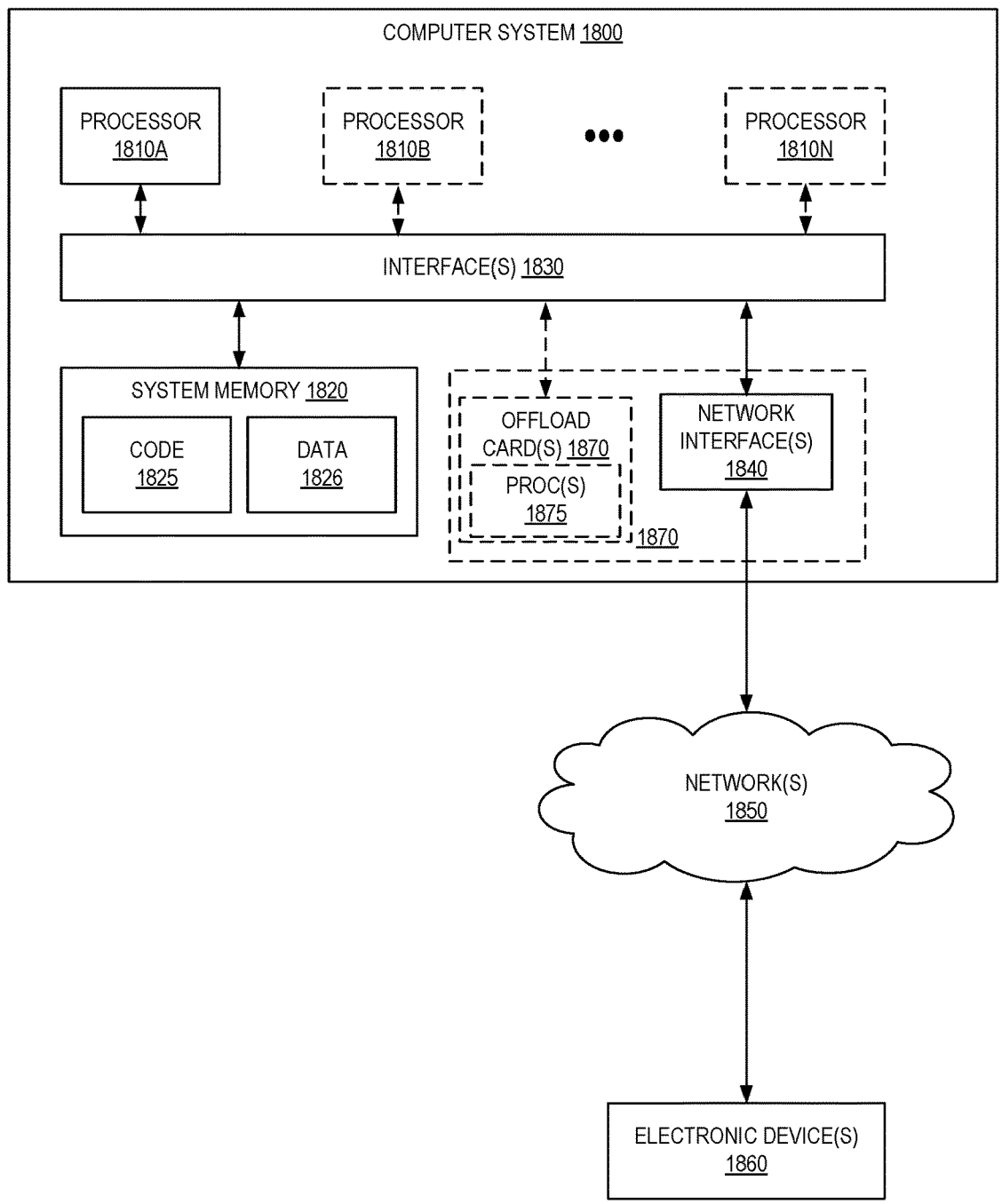
FIG. 18 is a block diagram illustrating an example computer system that may be used in some embodiments.

In some embodiments, a system that implements a portion or all of the techniques for S2S models as described herein may include a general-purpose computer system that includes or is configured to access one or more computer-accessible media, such as computer system 1800 illustrated in FIG. 18. In the illustrated embodiment, computer system 1800 includes one or more processors 1810 coupled to a system memory 1820 via an input/output (I/O) interface 1830. Computer system 1800 further includes a network interface 1840 coupled to I/O interface 1830. While FIG. 18 shows computer system 1800 as a single computing device, in various embodiments a computer system 1800 may include one computing device or any number of computing devices configured to work together as a single computer system 1800.

In various embodiments, computer system 1800 may be a uniprocessor system including one processor 1810, or a multiprocessor system including several processors 1810 (e.g., two, four, eight, or another suitable number). Processors 1810 may be any suitable processors capable of executing instructions. For example, in various embodiments, processors 1810 may be general-purpose or embedded processors implementing any of a variety of instruction set architectures (ISAs), such as the x86, ARM, PowerPC, SPARC, or MIPS ISAs, or any other suitable ISA. In multiprocessor systems, each of processors 1810 may commonly, but not necessarily, implement the same ISA.

System memory 1820 may store instructions and data accessible by processor(s) 1810. In various embodiments, system memory 1820 may be implemented using any suitable memory technology, such as random-access memory (RAM), static RAM (SRAM), synchronous dynamic RAM (SDRAM), nonvolatile/Flash-type memory, or any other type of memory. In the illustrated embodiment, program instructions and data implementing one or more desired functions, such as those methods, techniques, and data described above for resizing virtual networks in provider network environments, are shown stored within system memory 1820 as code 1825 and data 1826.

In one embodiment, I/O interface 1830 may be configured to coordinate I/O traffic between processor 1810, system memory 1820, and any peripheral devices in the device, including network interface 1840 or other peripheral interfaces. In some embodiments, I/O interface 1830 may perform any necessary protocol, timing or other data transformations to convert data signals from one component (e.g., system memory 1820) into a format suitable for use by another component (e.g., processor 1810). In some embodiments, I/O interface 1830 may include support for devices attached through various types of peripheral buses, such as a variant of the Peripheral Component Interconnect (PCI) bus standard or the Universal Serial Bus (USB) standard, for example. In some embodiments, the function of I/O interface 1830 may be split into two or more separate components, such as a north bridge and a south bridge, for example. Also, in some embodiments some or all of the functionality of I/O interface 1830, such as an interface to system memory 1820, may be incorporated directly into processor 1810.

Network interface 1840 may be configured to allow data to be exchanged between computer system 1800 and other devices 1860 attached to a network or networks 1850, such as other computer systems or devices as illustrated in FIG. 1, for example. In various embodiments, network interface 1840 may support communication via any suitable wired or wireless general data networks, such as types of Ethernet network, for example. Additionally, network interface 1840 may support communication via telecommunications/telephony networks such as analog voice networks or digital fiber communications networks, via storage area networks (SANs) such as Fibre Channel SANs, or via I/O any other suitable type of network and/or protocol.

In some embodiments, a computer system 1800 includes one or more offload cards 1870 (including one or more processors 1875, and possibly including the one or more network interfaces 1840) that are connected using an I/O interface 1830 (e.g., a bus implementing a version of the Peripheral Component Interconnect—Express (PCI-E) standard, or another interconnect such as a QuickPath interconnect (QPI) or UltraPath interconnect (UPI)). For example, in some embodiments the computer system 1800 may act as a host electronic device (e.g., operating as part of a hardware virtualization service) that hosts compute instances, and the one or more offload cards 1870 execute a virtualization manager that can manage compute instances that execute on the host electronic device. As an example, in some embodiments the offload card(s) 1870 can perform compute instance management operations such as pausing and/or un-pausing compute instances, launching and/or terminating compute instances, performing memory transfer/copying operations, etc. These management operations may, in some embodiments, be performed by the offload card(s) 1870 in coordination with a hypervisor (e.g., upon a request from a hypervisor) that is executed by the other processors 1810A-1810N of the computer system 1800. However, in some embodiments the virtualization manager implemented by the offload card(s) 1870 can accommodate requests from other entities (e.g., from compute instances themselves), and may not coordinate with (or service) any separate hypervisor.

In some embodiments, system memory 1820 may be one embodiment of a computer-accessible medium configured to store program instructions and data as described above. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computer system 1800 via I/O interface 1830. A non-transitory computer-accessible storage medium may also include any volatile or non-volatile media such as RAM (e.g., SDRAM, double data rate (DDR) SDRAM, SRAM, etc.), read only memory (ROM), etc., that may be included in some embodiments of computer system 1800 as system memory 1820 or another type of memory. Further, a computer-accessible medium may include transmission media or signals such as electrical, electromagnetic, or digital signals, conveyed via a communication medium such as a network and/or a wireless link, such as may be implemented via network interface 1840.

Figure 19:
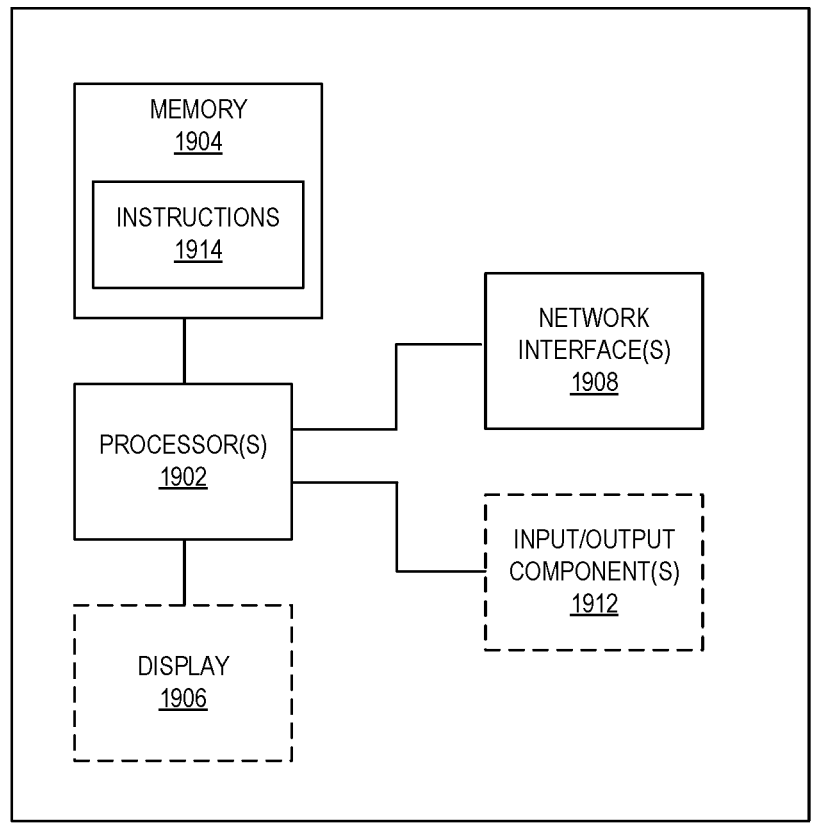
FIG. 19 illustrates a logical arrangement of a set of general components of an exemplary computing device that can be utilized in accordance with various embodiments.

FIG. 19 illustrates a logical arrangement of a set of general components of an example computing device 1900 such as those detailed above. Generally, a computing device 1900 can also be referred to as an electronic device. The techniques shown in the figures and described herein can be implemented using code and data stored and executed on one or more electronic devices (e.g., a client end station and/or server end station). Such electronic devices store and communicate (internally and/or with other electronic devices over a network) code and data using computer-readable media, such as non-transitory computer-readable storage media (e.g., magnetic disks, optical disks, Random Access Memory (RAM), Read Only Memory (ROM), flash memory devices, phase-change memory) and transitory computer-readable communication media (e.g., electrical, optical, acoustical or other form of propagated signals, such as carrier waves, infrared signals, digital signals). In addition, such electronic devices include hardware, such as a set of one or more processors 1902 (e.g., wherein a processor is a microprocessor, controller, microcontroller, central processing unit, digital signal processor, application specific integrated circuit, field programmable gate array, other electronic circuitry, a combination of one or more of the preceding) coupled to one or more other components, e.g., one or more non-transitory machine-readable storage media (e.g., memory 1904) to store code (e.g., instructions 1914) and/or data, and a set of one or more wired or wireless network interfaces 1908 allowing the electronic device to transmit data to and receive data from other computing devices, typically across one or more networks (e.g., Local Area Networks (LANs), the Internet). The coupling of the set of processors and other components is typically through one or more interconnects within the electronic device, (e.g., busses and possibly bridges). Thus, the non-transitory machine-readable storage media (e.g., memory 1904) of a given electronic device typically stores code (e.g., instructions 1914) for execution on the set of one or more processors 1902 of that electronic device. One or more parts of various embodiments may be implemented using different combinations of software, firmware, and/or hardware.

A computing device 1900 can include some type of display element 1906, such as a touch screen or liquid crystal display (LCD), although many devices such as portable media players might convey information via other means, such as through audio speakers, and other types of devices such as server end stations may not have a display element 1906 at all. As discussed, some computing devices used in some embodiments include at least one input and/or output component(s) 1912 able to receive input from a user. This input component can include, for example, a push button, touch pad, touch screen, wheel, joystick, keyboard, mouse, keypad, or any other such device or element whereby a user is able to input a command to the device. In some embodiments, however, such a device might be controlled through a combination of visual and/or audio commands and utilize a microphone, camera, sensor, etc., such that a user can control the device without having to be in physical contact with the device.

Figure 20:
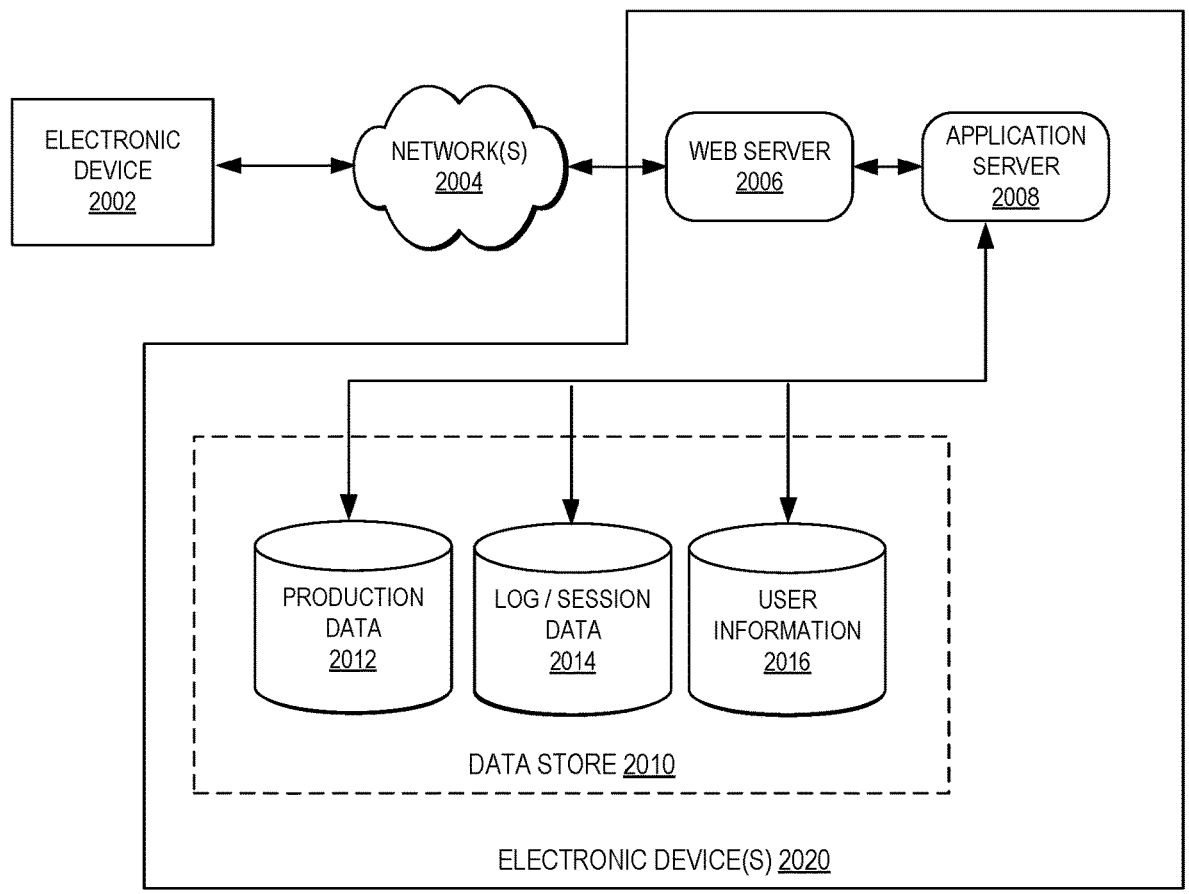
FIG. 20 illustrates an example of an environment for implementing aspects in accordance with various embodiments.

As discussed, different approaches can be implemented in various environments in accordance with the described embodiments. For example, FIG. 20 illustrates an example of an environment 2000 for implementing aspects in accordance with various embodiments. For example, in some embodiments the requests are HyperText Transfer Protocol (HTTP) requests that are received by a web server (e.g., web server 2006) via an API, and the users, via electronic devices, may interact with the provider network via a web portal provided via the web server 2006 and application server 2008. As will be appreciated, although a web-based environment is used for purposes of explanation, different environments may be used, as appropriate, to implement various embodiments. The system includes an electronic client device 2002, which may also be referred to as a client device and can be any appropriate device operable to send and receive requests, messages or information over an appropriate network 2004 and convey information back to a user of the device 2002. Examples of such client devices include personal computers (PCs), cell phones, handheld messaging devices, laptop computers, set-top boxes, personal data assistants, electronic book readers, wearable electronic devices (e.g., glasses, wristbands, monitors), and the like. The one or more networks 2004 can include any appropriate network, including an intranet, the Internet, a cellular network, a local area network, or any other such network or combination thereof. Components used for such a system can depend at least in part upon the type of network and/or environment selected. Protocols and components for communicating via such a network are well known and will not be discussed herein in detail. Communication over the network can be enabled via wired or wireless connections and combinations thereof. In this example, the network 2004 includes the Internet, as the environment includes a web server 2006 for receiving requests and serving content in response thereto, although for other networks an alternative device serving a similar purpose could be used, as would be apparent to one of ordinary skill in the art.

The illustrative environment includes at least one application server 2008 and a data store 2010. It should be understood that there can be several application servers, layers, or other elements, processes or components, which may be chained or otherwise configured, which can interact to perform tasks such as obtaining data from an appropriate data store. As used herein the term "data store" refers to any device or combination of devices capable of storing, accessing and retrieving data, which may include any combination and number of data servers, databases, data storage devices and data storage media, in any standard, distributed or clustered environment. The application server 2008 can include any appropriate hardware and software for integrating with the data store 2010 as needed to execute aspects of one or more applications for the client device 2002 and handling a majority of the data access and business logic for an application. The application server 2008 provides access control services in cooperation with the data store 2010 and is able to generate content such as text, graphics, audio, video, etc., to be transferred to the client device 2002, which may be served to the user by the web server in the form of HyperText Markup Language (HTML), Extensible Markup Language (XML), JavaScript Object Notation (JSON), or another appropriate unstructured or structured language in this example. The handling of all requests and responses, as well as the delivery of content between the client device 2002 and the application server 2008, can be handled by the web server 2006. It should be understood that the web server 2006 and application server 2008 are not required and are merely example components, as structured code discussed herein can be executed on any appropriate device or host machine as discussed elsewhere herein.

The data store 2010 can include several separate data tables, databases, or other data storage mechanisms and media for storing data relating to a particular aspect. For example, the data store illustrated includes mechanisms for storing production data 2012 and user information 2016, which can be used to serve content for the production side. The data store 2010 also is shown to include a mechanism for storing log or session data 2014. It should be understood that there can be many other aspects that may need to be stored in the data store, such as page image information and access rights information, which can be stored in any of the above listed mechanisms as appropriate or in additional mechanisms in the data store 2010. The data store 2010 is operable, through logic associated therewith, to receive instructions from the application server 2008 and obtain, update, or otherwise process data in response thereto. In one example, a user might submit a search request for a certain type of item. In this case, the data store 2010 might access the user information 2016 to verify the identity of the user and can access a production data 2012 to obtain information about items of that type. The information can then be returned to the user, such as in a listing of results on a web page that the user is able to view via a browser on the user device 2002. Information for a particular item of interest can be viewed in a dedicated page or window of the browser.

The web server 2006, application server 2008, and/or data store 2010 may be implemented by one or more electronic devices 2020, which can also be referred to as electronic server devices or server end stations, and may or may not be located in different geographic locations. Each of the one or more electronic devices 2020 may include an operating system that provides executable program instructions for the general administration and operation of that device and typically will include computer-readable medium storing instructions that, when executed by a processor of the device, allow the device to perform its intended functions. Suitable implementations for the operating system and general functionality of the devices are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 20. Thus, the depiction of the environment 2000 in FIG. 20 should be taken as being illustrative in nature and not limiting to the scope of the disclosure.

Various embodiments discussed or suggested herein can be implemented in a wide variety of operating environments, which in some cases can include one or more user computers, computing devices, or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and/or other devices capable of communicating via a network.

Most embodiments utilize at least one network that would be familiar to those skilled in the art for supporting communications using any of a variety of commercially-available protocols, such as Transmission Control Protocol/Internet Protocol (TCP/IP), File Transfer Protocol (FTP), Universal Plug and Play (UPnP), Network File System (NFS), Common Internet File System (CIFS), Extensible Messaging and Presence Protocol (XMPP), AppleTalk, etc. The network(s) can include, for example, a local area network (LAN), a wide-area network (WAN), a virtual private network (VPN), the Internet, an intranet, an extranet, a public switched telephone network (PSTN), an infrared network, a wireless network, and any combination thereof.

In embodiments utilizing a web server, the web server can run any of a variety of server or mid-tier applications, including HTTP servers, File Transfer Protocol (FTP) servers, Common Gateway Interface (CGI) servers, data servers, Java servers, business application servers, etc. The server(s) also may be capable of executing programs or scripts in response requests from user devices, such as by executing one or more Web applications that may be implemented as one or more scripts or programs written in any programming language, such as Java®, C, C # or C++, or any scripting language, such as Perl, Python, PHP, or TCL, as well as combinations thereof. The server(s) may also include database servers, including without limitation those commercially available from Oracle®, Microsoft®, Sybase®, IBM®, etc. The database servers may be relational or non-relational (e.g., "NoS13"), distributed or non-distributed, etc.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and/or at least one output device (e.g., a display device, printer, or speaker). Such a system may also include one or more storage devices, such as disk drives, optical storage devices, and solid-state storage devices such as random-access memory (RAM) or read-only memory (ROM), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory (EEPROM), flash memory or other memory technology, Compact Disc-Read Only Memory (CD-ROM), Digital Versatile Disk (DVD) or other optical storage, magnetic cassettes, magnetic tape, magnetic disk storage or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

In the preceding description, various embodiments are described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Bracketed text and blocks with dashed borders (e.g., large dashes, small dashes, dot-dash, and dots) are used herein to illustrate optional operations that add additional features to some embodiments. However, such notation should not be taken to mean that these are the only options or optional operations, and/or that blocks with solid borders are not optional in certain embodiments.

Reference numerals with suffix letters may be used to indicate that there can be one or multiple instances of the referenced entity in various embodiments, and when there are multiple instances, each does not need to be identical but may instead share some general traits or act in common ways. Further, the particular suffixes used are not meant to imply that a particular amount of the entity exists unless specifically indicated to the contrary. Thus, two entities using the same or different suffix letters may or may not have the same number of instances in various embodiments.

References to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Moreover, in the various embodiments described above, unless specifically noted otherwise, disjunctive language such as the phrase "at least one of A, B, or C" is intended to be understood to mean either A, B, or C, or any combination thereof (e.g., A, B, and/or C). As such, disjunctive language is not intended to, nor should it be understood to, imply that a given embodiment requires at least one of A, at least one of B, or at least one of C to each be present.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

What is claimed is:

1. A computer-implemented method comprising:
receiving, at a sequence to sequence (S2S) algorithm generator, via an application programing interface (API), a request to build a S2S model for a use case, wherein the request includes or identifies at least a training data set;
determining, by an input data analyzer of the S2S algorithm generator using the training data set, and using previous model data for previously generated S2S models, a set of use cases in previously generated S2S models that are similar to the use case of the request, wherein a use case at least defines network primitives;
receiving, by a parameter analyzer of the S2S algorithm generator, the set of use cases in the previously generated S2S models;
determining, by the parameter analyzer using the previous model data and the set of use cases in the previously generated S2S models, parameters that apply to the set of use cases in the previously generated S2S models;
receiving, by a hyperparameter recommendation engine of the S2S algorithm generator, the set of use cases in the previously generated S2S models;
determining, by the hyperparameter recommendation engine using the previous model data and the set of use cases in the previously generated S2S models, hyperparameters that apply to the set of use cases in the previously generated S2S models;
receiving, by an algorithm builder of the S2S algorithm generator, the parameters that apply to the set of use cases in the previously generated S2S models and the hyperparameters that apply to the set of use cases in the previously generated S2S models;
building, by the algorithm builder using the parameters that apply to the set of use cases in the previously generated S2S models and the hyperparameters that apply to the set of use cases in the previously generated S2S models, a S2S algorithm;
storing the S2S algorithm as a part of a container;
executing code in the container using the training data set to generate the S2S model; and
storing information regarding parameters, hyperparameters, and network primitives for the S2S model.

2. The computer-implemented method of claim 1, wherein the network primitives include an encoder and a decoder, and at least one of the determined hyperparameters is related to a number of layers of the encoder and the decoder.

3. The computer-implemented method of claim 2, wherein the network primitives further include one or more of an attention layer, a loss function, and an accuracy/quality metric.

4. A computer-implemented method comprising:
receiving, at a sequence to sequence (S2S) algorithm generator, via an application programing interface (API), a request to build a S2S model for a use case, wherein the request includes or identifies at least a training data set;
determining, by an input data analyzer of the S2S algorithm generator using the training data set, and using previous model data for previously generated S2S models, at least one use case in the previously generated S2S models that is similar to the use case of the request, wherein a use case at least defines network primitives;
determining, by a parameter analyzer of the S2S algorithm generator using the previous model data and the at least one use case in the previously generated S2S models, any parameters that apply to the at least one use case in the previously generated S2S models;
determining, by a hyperparameter recommendation engine of the S2S algorithm generator using the previous model data and the at least one use case in the previously generated S2S models, any hyperparameters that apply to the at least one use case in the previously generated S2S models;
receiving, by an algorithm builder of the S2S algorithm generator, the parameters that apply to the at least one use case in the previously generated S2S models and the hyperparameters that apply to the at least one use case in the previously generated S2S models;
generating, by the algorithm builder using the parameters that apply to the at least one use case in the previously generated S2S models and the hyperparameters that apply to the at least one use case in the previously generated S2S models, parts of a S2S algorithm; and
training another S2S algorithm built from the parts of the S2S algorithm using the training data set to generate the S2S model.

5. The computer-implemented method of claim 4, further comprising storing information regarding parameters, hyperparameters, and network primitives for the S2S model.

6. The computer-implemented method of claim 4, further comprising pre-processing data prior to training.

7. The computer-implemented method of claim 4, wherein the network primitives include an encoder and a decoder, and at least one of the determined hyperparameters is related to a number of layers of the encoder and the decoder.

8. The computer-implemented method of claim 7, wherein the network primitives further include one or more of an attention layer, a loss function, and an accuracy/quality metric.

9. The computer-implemented method of claim 4, wherein the network primitives comprise one or more of convolutional neural network encoders, recurrent neural network encoders, convolutional neural network decoders, recurrent neural network decoders, dot product attention, scaled attention, cross entropy loss function, smooth cross entropy loss function, perplexity, and bilingual evaluation understudy (BLEU).

10. The computer-implemented method of claim 4, wherein the S2S model is one of a translation model, summarization model, and a speech-to-text model.

11. The computer-implemented method of claim 4, wherein determining any hyperparameters that apply to the at least one use case is performed by a search.

12. The computer-implemented method of claim 4, wherein the built S2S algorithm is a part of a container.

13. The computer-implemented method of claim 12, wherein training the S2S algorithm comprises:
initializing a virtual machine instance;
retrieving the training data;
initializing the container in the virtual machine instance; and
executing code stored in the container using the training data.

14. The computer-implemented method of claim 4, further comprising performing an inference using the S2S model.

15. A system comprising:
a client device that is configured to send a request to build a sequence to sequence (S2S) model for a use case, wherein the request includes or identifies at least a training data set; and
a web services provider system including a S2S algorithm generator configured to receive, via an application programing interface (API), the request and, in response to the request,
determine, by an input data analyzer of the S2S algorithm generator using the training data set, and using previous model data for previously generated S2S models, at least one use case in the previously generated S2S models that is similar to a use case of the request, wherein a use case at least defines network primitives;
determine, by a parameter analyzer of the S2S algorithm generator using the previous model data and the at least one use case in the previously generated S2S models, any parameters that apply to the at least one use case in the previously generated S2S models;
determine, by a hyperparameter recommendation engine of the S2S algorithm generator using the previous model data and the at least one use case in the previously generated S2S models, any hyperparameters that apply to the at least one use case in the previously generated S2S models;
receiving, by an algorithm builder of the S2S algorithm generator, the parameters that apply to the at least one use case in the previously generated S2S models and the hyperparameters that apply to the at least one use case in the previously generated S2S models;
generate, by the algorithm builder using the parameters that apply to the at least one use case in the previously generated S2S models and the hyperparameters that apply to the at least one use case in the previously generated S2S models, parts of a S2S algorithm; and train another S2S algorithm built from the parts of the S2S algorithm using the training data set to generate the S2S model.

16. The system of claim 15, wherein the web services provider system is to store information regarding parameters, hyperparameters, and network primitives for the S2S model.

17. The system of claim 15, wherein the web services provider system is to pre-process data prior to training.

18. The system of claim 15, wherein the network primitives include an encoder and a decoder, and at least one of the determined hyperparameters is related to a number of layers of the encoder and the decoder.

19. The system of claim 18, wherein the network primitives further include one car more of an attention layer, a loss function, and an accuracy/quality metric.

20. The system of claim 15, wherein the network primitives comprise one or more of convolutional neural network encoders, recurrent neural network encoders, convolutional neural network decoders, recurrent neural network decoders, dot product attention, scaled attention, cross entropy loss function, smooth cross entropy loss function, perplexity, and bilingual evaluation understudy (BLEU).

* * * * *